(12) United States Patent
Reed

(10) Patent No.: US 9,967,933 B2
(45) Date of Patent: May 8, 2018

(54) ELECTRONIC CONTROL TO REGULATE POWER FOR SOLID-STATE LIGHTING AND METHODS THEREOF

(71) Applicant: Express Imaging Systems, LLC, Renton, WA (US)

(72) Inventor: William G. Reed, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days. days.

(21) Appl. No.: 14/806,500

(22) Filed: Jul. 22, 2015

(65) Prior Publication Data

US 2016/0021713 A1 Jan. 21, 2016

Related U.S. Application Data

(62) Division of application No. 12/619,535, filed on Nov. 16, 2009, now Pat. No. 9,125,261.

(Continued)

(51) Int. Cl.
*H05B 33/08* (2006.01)

(52) U.S. Cl.
CPC ....... *H05B 33/0827* (2013.01); *H05B 33/083* (2013.01); *H05B 33/0815* (2013.01); *Y02B 20/346* (2013.01)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 2,240,050 A 4/1941 Nuebling
2,745,055 A 5/1956 Woerdemann
(Continued)

FOREIGN PATENT DOCUMENTS

CN 103162187 A 6/2013
DE 40 01 980 8/1990
(Continued)

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
(Continued)

*Primary Examiner* — Minh D A
(74) *Attorney, Agent, or Firm* — Seed IP Law Group LLP

(57) ABSTRACT

Apparatus and methods to regulate an input power applied to a plurality of light emitters are provided. A regulator device includes a plurality of switches and a control circuit that controls the plurality of switches. The plurality of switches selectively couple respective strings of the light emitters in series to the input power to emit light when deactivated. The control circuit may deactivate a number of the switches to couple the respective light emitters to the input power in response to a sensed operational parameter of the input power. The control circuit may adjust the number of the switches deactivated in response to a change in the sensed operational parameter of the input power. A number of the light emitters may be coupled to the input power regardless of the sensed operational parameter of the input power.

25 Claims, 11 Drawing Sheets

Related U.S. Application Data

(60) Provisional application No. 61/154,619, filed on Feb. 23, 2009, provisional application No. 61/115,438, filed on Nov. 17, 2008.

(58) Field of Classification Search
CPC ............. H05B 37/029; H05B 33/0803; H05B 37/0254; H05B 37/02; H05B 33/0827; H05B 33/0809; H05B 33/0821; F21Y 2101/02

See application file for complete search history.

(56) References Cited

U.S. PATENT DOCUMENTS

| | | |
|---|---|---|
| 3,374,396 A | 3/1968 | Bell et al. |
| 4,153,927 A | 5/1979 | Owens |
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,838,226 A | 11/1998 | Houggy et al. |
| 5,869,960 A | 2/1999 | Brand |
| 5,892,331 A | 4/1999 | Hollaway |
| 5,892,335 A | 4/1999 | Archer |
| 5,936,362 A | 8/1999 | Alt et al. |
| 5,995,350 A | 11/1999 | Kopelman |
| 6,111,739 A | 8/2000 | Wu et al. |
| 6,149,283 A | 11/2000 | Conway et al. |
| 6,154,015 A | 11/2000 | Ichiba |
| 6,160,353 A | 12/2000 | Mancuso |
| 6,198,233 B1 | 3/2001 | McConaughy |
| 6,211,627 B1 | 4/2001 | Callahan |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-Johansen |
| 6,880,956 B2 | 4/2005 | Zhang |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,190,121 B2 | 3/2007 | Rose et al. |
| 7,239,087 B2 | 7/2007 | Ball |
| 7,270,441 B2 | 9/2007 | Fiene |
| 7,281,820 B2 | 10/2007 | Bayat et al. |
| 7,294,973 B2 | 11/2007 | Takahama et al. |
| 7,317,403 B2 | 1/2008 | Grootes et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,440,280 B2 | 10/2008 | Shuy |
| 7,468,723 B1* | 12/2008 | Collins .............. H05B 33/0815 345/102 |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,623,042 B2 | 11/2009 | Huizenga |
| 7,627,372 B2 | 12/2009 | Vaisnys et al. |
| 7,633,463 B2 | 12/2009 | Negru |
| 7,638,743 B2 | 12/2009 | Bartol et al. |
| 7,665,862 B2 | 2/2010 | Villard |
| 7,677,753 B1 | 3/2010 | Wills |
| 7,688,002 B2 | 3/2010 | Ashdown et al. |
| 7,688,222 B2 | 3/2010 | Peddie et al. |
| 7,702,135 B2 | 4/2010 | Hill et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,872,423 B2 | 1/2011 | Biery et al. |
| 7,940,191 B2 | 5/2011 | Hierzer |
| 7,960,919 B2 | 6/2011 | Furukawa |
| 7,983,817 B2 | 6/2011 | Breed |
| 8,174,212 B2 | 5/2012 | Tziony et al. |
| 8,183,797 B2 | 5/2012 | McKinney |
| 8,207,830 B2 | 6/2012 | Rutjes et al. |
| 8,260,575 B2 | 9/2012 | Walters et al. |
| 8,290,710 B2 | 10/2012 | Cleland et al. |
| 8,324,840 B2 | 12/2012 | Shteynberg et al. |
| 8,344,665 B2 | 1/2013 | Verfuerth et al. |
| 8,376,583 B2 | 2/2013 | Wang et al. |
| 8,395,329 B2 | 3/2013 | Jutras et al. |
| 8,445,826 B2 | 5/2013 | Verfuerth |
| 8,457,793 B2 | 6/2013 | Golding et al. |
| 8,476,565 B2 | 7/2013 | Verfuerth |
| 8,586,902 B2 | 11/2013 | Verfuerth |
| 8,604,701 B2 | 12/2013 | Verfuerth et al. |
| 8,610,358 B2 | 12/2013 | Reed |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,866,392 B2 | 10/2014 | Chen |
| 8,866,582 B2 | 10/2014 | Verfuerth et al. |
| 8,872,430 B2 | 10/2014 | Yang |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 8,975,827 B2 | 3/2015 | Chobot et al. |
| 9,002,522 B2 | 4/2015 | Mohan et al. |
| 9,024,545 B2 | 5/2015 | Bloch et al. |
| 9,084,310 B2 | 7/2015 | Bedell et al. |
| 9,450,347 B2 | 9/2016 | Kondou et al. |
| 9,781,797 B2 | 10/2017 | Reed |
| 9,801,248 B2 | 10/2017 | Reed et al. |
| 2002/0084767 A1 | 7/2002 | Arai |
| 2002/0113192 A1 | 8/2002 | Antila |
| 2003/0016143 A1 | 1/2003 | Ghazarian |
| 2003/0184672 A1 | 10/2003 | Wu et al. |
| 2003/0214242 A1* | 11/2003 | Berg-johansen ......... G09G 3/14 315/169.3 |
| 2004/0095772 A1 | 5/2004 | Hoover et al. |
| 2004/0105264 A1 | 6/2004 | Spero |
| 2004/0120148 A1 | 6/2004 | Morris et al. |
| 2004/0192227 A1 | 9/2004 | Beach et al. |
| 2005/0117344 A1 | 6/2005 | Bucher et al. |
| 2005/0135101 A1 | 6/2005 | Richmond |
| 2005/0174762 A1 | 8/2005 | Fogerlie |
| 2005/0174780 A1 | 8/2005 | Park |
| 2005/0179404 A1 | 8/2005 | Veskovic et al. |
| 2005/0231133 A1 | 10/2005 | Lys |
| 2005/0243022 A1* | 11/2005 | Negru ................ H05B 33/0857 345/46 |
| 2005/0254013 A1 | 11/2005 | Engle et al. |
| 2006/0001384 A1 | 1/2006 | Tain et al. |
| 2006/0014118 A1 | 1/2006 | Utama |
| 2006/0053459 A1 | 3/2006 | Simerly et al. |
| 2006/0066264 A1 | 3/2006 | Ishigaki et al. |
| 2006/0098440 A1 | 5/2006 | Allen |

(56) References Cited

U.S. PATENT DOCUMENTS

| | | |
|---|---|---|
| 2006/0133079 A1 | 6/2006 | Callahan |
| 2006/0146652 A1 | 7/2006 | Huizi et al. |
| 2006/0202914 A1 | 9/2006 | Ashdown |
| 2006/0208667 A1 | 9/2006 | Lys et al. |
| 2006/0277823 A1 | 12/2006 | Barnett et al. |
| 2007/0032990 A1 | 2/2007 | Williams et al. |
| 2007/0096118 A1 | 5/2007 | Mahalingam et al. |
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2007/0247853 A1 | 10/2007 | Dorogi |
| 2007/0279921 A1 | 12/2007 | Alexander et al. |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0062687 A1 | 3/2008 | Behar et al. |
| 2008/0068192 A1* | 3/2008 | Ashdown ............ H05B 33/0818 340/664 |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2008/0271065 A1 | 10/2008 | Buonasera et al. |
| 2009/0046151 A1 | 2/2009 | Nagaoka et al. |
| 2009/0058320 A1 | 3/2009 | Chou et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195179 A1 | 8/2009 | Joseph et al. |
| 2009/0230883 A1* | 9/2009 | Haug .................... H05B 33/083 315/297 |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278474 A1 | 11/2009 | Reed et al. |
| 2009/0278479 A1 | 11/2009 | Platner et al. |
| 2009/0284155 A1 | 11/2009 | Reed et al. |
| 2009/0315485 A1 | 12/2009 | Verfuerth et al. |
| 2010/0001652 A1 | 1/2010 | Damsleth |
| 2010/0052557 A1 | 3/2010 | Van Der Veen et al. |
| 2010/0060130 A1 | 3/2010 | Li |
| 2010/0090577 A1 | 4/2010 | Reed et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0237711 A1 | 9/2010 | Parsons |
| 2010/0244708 A1 | 9/2010 | Cheung et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0277082 A1 | 11/2010 | Reed et al. |
| 2010/0295454 A1 | 11/2010 | Reed |
| 2010/0295455 A1 | 11/2010 | Reed |
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0175518 A1 | 7/2011 | Reed et al. |
| 2011/0204845 A1 | 8/2011 | Paparo et al. |
| 2011/0215724 A1 | 9/2011 | Chakravarty et al. |
| 2011/0215731 A1 | 9/2011 | Jeong et al. |
| 2011/0215751 A1 | 9/2011 | Sato |
| 2011/0221346 A1 | 9/2011 | Lee et al. |
| 2011/0222195 A1 | 9/2011 | Benoit et al. |
| 2011/0248812 A1 | 10/2011 | Hu et al. |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2012/0262069 A1 | 10/2012 | Reed |
| 2013/0033183 A1 | 2/2013 | Verfuerth et al. |
| 2013/0049613 A1 | 2/2013 | Reed |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0293112 A1 | 11/2013 | Reed et al. |
| 2013/0307418 A1 | 11/2013 | Reed |
| 2013/0313982 A1 | 11/2013 | Reed |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0055990 A1 | 2/2014 | Reed |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0139116 A1 | 5/2014 | Reed |
| 2014/0159585 A1 | 6/2014 | Reed |
| 2014/0166447 A1 | 6/2014 | Thea et al. |
| 2014/0203714 A1 | 7/2014 | Zhang et al. |
| 2014/0225521 A1 | 8/2014 | Reed |
| 2014/0244044 A1 | 8/2014 | Davis et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2014/0320027 A1 | 10/2014 | Reed |
| 2015/0015716 A1 | 1/2015 | Reed et al. |
| 2015/0077019 A1 | 3/2015 | Reed et al. |
| 2015/0208479 A1 | 7/2015 | Radermacher et al. |
| 2015/0280782 A1 | 10/2015 | Airbinger et al. |
| 2015/0312983 A1 | 10/2015 | Hu et al. |
| 2016/0150622 A1 | 5/2016 | Flinsenberg et al. |
| 2017/0055324 A1 | 2/2017 | Reed |

FOREIGN PATENT DOCUMENTS

| | | |
|---|---|---|
| EP | 1 459 600 A2 | 9/2004 |
| EP | 1 734 795 | 12/2006 |
| EP | 2 559 937 A1 | 2/2013 |
| EP | 2 781 138 A1 | 9/2014 |
| FR | 2 883 306 | 9/2006 |
| JP | 6-335241 A | 12/1994 |
| JP | 2001-333420 | 11/2001 |
| JP | 2004-279668 A | 10/2004 |
| JP | 2004-320024 A | 11/2004 |
| JP | 2004/349065 | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006/244711 | 9/2006 |
| JP | 2008-59811 A | 3/2008 |
| JP | 2008-509538 A | 3/2008 |

(56) References Cited

FOREIGN PATENT DOCUMENTS

| | | |
|---|---|---|
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 10-2005-0078403 A | 8/2005 |
| KR | 10-2006-0071869 A | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 | 9/2002 |
| WO | 03/056882 | 7/2003 |
| WO | 2005/003625 A1 | 1/2005 |
| WO | 2006/057866 | 6/2006 |
| WO | 2007/023454 A1 | 3/2007 |
| WO | 2007/036873 | 4/2007 |
| WO | 2008/030450 | 3/2008 |
| WO | 2008/034242 A1 | 3/2008 |
| WO | 2009/040703 | 4/2009 |
| WO | 2010/086757 A1 | 8/2010 |
| WO | 2010/133719 A1 | 11/2010 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

EE Herald, "Devices to protect High brightness LED from ESD," dated Mar. 16, 2009, retrieved Jun. 10, 2011, retrieved from http://www.eeherald.com/section/new-products/np100779.html, 1 page.

Extended European Search Report, dated Aug. 13, 2014, for corresponding European Application No. 09826926.9, 8 pages.

Extended European Search Report, dated Oct. 15, 2015, for corresponding European Application No. 12825132.9-1802, 5 pages.

Extended European Search Report, dated Sep. 28, 2015, for corresponding European Application No. 12850159.0-1802,6 pages.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.

International Search Report dated Nov. 11, 2014, for International Application No. PCT/US2014/047867, 3 pages.

International Search Report, dated Dec. 13, 2010 for PCT/US2010/035649, 3 pages.

International Search Report, dated Dec. 15, 2010 for PCT/US2010/035658, 3 pages.

International Search Report, dated Dec. 28, 2010 for PCT/US2010/035651, 3 pages.

International Search Report, dated Dec. 30, 2013 for PCT/US2013/058266, 3 pages.

International Search Report, dated Feb. 26, 2014, for PCT/US2013/070794, 3 pages.

International Search Report, dated Feb. 27, 2013, for PCT/US2012/065476, 3 pages.

International Search Report, dated Jan. 14, 2013, for PCT/US2012/052009, 3 pages.

International Search Report, dated Jul. 9, 2009 for PCT/US2009/043171, 3 pages.

International Search Report and Written Opinion, dated May 7, 2015, for corresponding International Application No. PCT/US2015/013512, 15 pages.

International Search Report, dated Nov. 19, 2013 for PCT/US2013/052092, 4 pages.

International Search Report, dated Oct. 8, 2012 for PCT/US2012/033059, 3 pages.

International Search Report, dated Sep. 30, 2011, for PCT/US2011/021359, 3 pages.

Japanese Office Action, dated Jan. 6, 2015, for corresponding Japanese Application No. 2011-536564, 6 pages.

Kadirvel et al., "Self-Powered, Ambient Light Sensor Using bq25504," Texas Instruments, Application Report, SLUA629—Jan. 2012, 6 pages.

Littelfuse, "Application Note: Protecting LEDs in Product Designs," 2009, 2 pages.

Panasonic Electronic Components, "LED Lighting Solutions," 2009, 6 pages.

Poplawski, "Exploring Flicker & LEDs," 2010 DOE SSL Market Introduction Workshop, U.S. Department of Energy, Jul. 22, 2010, 16 pages.

Reed et al., "Apparatus and Method for Schedule Based Operation of a Luminaire" U.S. Appl. No. 13/604,327, filed Sep. 5, 2012, 44 pages.

Reed et al., "Apparatus and Method for Schedule Based Operation of a Luminaire" Amendment filed Jun. 1, 2015, for U.S. Appl. No. 14/552,274, 14 pages.

Reed et al., "Apparatus and Method for Schedule Based Operation of a Luminaire" Notice of Allowance dated Jun. 19, 2015, for U.S. Appl. No. 14/552,274, 8 pages.

Reed et al., "Apparatus and Method of Operating a Luminaire," Notice of Allowance dated Apr. 27, 2015, for U.S. Appl. No. 13/558,191, 8 pages.

Reed et al., "Apparatus and Method of Operating a Luminaire," U.S. Appl. No. 13/558,191, filed Jul. 25, 2012, 84 pages.

Reed et al., "Apparatus, Method to Enhance Color Contrast in Phosphor-Based Solid State Lights," U.S. Appl. No. 61/534,722, filed Sep. 14, 2011, 53 pages.

Reed et al., "Gas-Discharge Lamp Replacement," U.S. Appl. No. 61/052,924, filed May 13, 2008, 32 pages.

Reed et al., "Low-Profile Pathway Illumination System," Amendment filed Jul. 29, 2011, for U.S. Appl. No. 12/437,472, 19 pages.

Reed et al., "Low-Profile Pathway Illumination System," U.S. Appl. No. 61/051,619, filed May 8, 2008, 25 pages.

Reed et al., "Low-Profile Pathway Illumination System," Notice of Allowance, dated Oct. 14, 2011, for U.S. Appl. No. 12/437,472, 9 pages.

Reed et al., "Low-Profile Pathway Illumination System," Office Action, dated May 5, 2011, for U.S. Appl. No. 12/437,472, 24 pages.

Reed et al., "Remotely Adjustable Solid-State Lamp," Amendment filed Jul. 20, 2015, for U.S. Appl. No. 13/875,130, 15 pages.

Reed et al., "Remotely Adjustable Solid-State Lamp," Amendment filed Apr. 1, 2015, for U.S. Appl. No. 13/875,130, 14 pages.

Reed et al., "Remotely Adjustable Solid-State Lamp," Corrected Notice of Allowance, dated Aug. 12, 2015, and Notice of Allowance, dated Jul. 31, 2015 for U.S. Appl. No. 13/875,130, 11 pages.

Reed et al., "Remotely Adjustable Solid-State Lamp," Office Action dated Apr. 21, 2015, for U.S. Appl. No. 13/875,130, 10 pages.

Reed et al., "Remotely Adjustable Solid-State Lamp," Preliminary Amendment and Response to Restriction Requirement, filed Apr. 1, 2015, for U.S. Appl. No. 13/875,130, 14 pages.

Reed et al., "Systems and Methods That Employ Object Recognition," U.S. Appl. No. 13/411,321, filed Mar. 2, 2012, 51 pages.

Reed et al., "Systems and Methods That Employ Object Recognition," Amendment filed May 6, 2015, for U.S. Appl. No. 13/411,321, 20 pages.

(56) References Cited

OTHER PUBLICATIONS

Reed et al., "Systems and Methods That Employ Object Recognition," Amendment filed Jul. 7, 2015, for U.S. Appl. No. 13/411,321, 21 pages.
Reed et al., "Adjustable Output Solid-State Lamp With Security Features," Notice of Allowance dated Aug. 29, 2014, for U.S. Appl. No. 13/679,687, 9 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," Office Action dated Feb. 27, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire," Office Action dated Mar. 26, 2014, for U.S. Appl. No. 13/604,327, 10 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance dated Jul. 7, 2014, for U.S. Appl. No. 13/604,327, 8 pages.
Reed et al., "Apparatus and Method for Schedule Based Operations of a Luminaire," Office Action dated Mar. 2, 2015, for U.S. Appl. No. 14/552,274, 7 pages.
Reed et al., "Apparatus and Method of Operating a Luminaire," Amendment filed Mar. 19, 2015, for U.S. Appl. No. 13/558,191, 20 pages.
Reed et al., "Apparatus and Method of Operating a Luminaire," Office Action dated Dec. 22, 2014, for U.S. Appl. No. 13/558,191, 17 pages.
Reed et al., "Apparatus, Method to Change Light Source Color Temperature with Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrically Isolated Heat Sink for Solid-State Light," U.S. Appl. No. 61/229,435, filed Jul. 29, 2009, 29 pages.
Reed et al., "Electrostatic Discharge Protection for Luminaire," Office Action dated Mar. 15, 2013 for U.S. Appl. No. 13/212,074, 11 pages.
Reed et al., "Gas-Discharge Lamp Replacement with Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Long-Range Motion Detection for Illumination Control," U.S. Appl. No. 12/784,080, filed May 20, 2010, 32 pages.
Reed et al., "Long-Range Motion Detection for Illumination Control," Office Action dated Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Notice of Allowance dated Jun. 20, 2014, for U.S. Appl. No. 12/784,080, 7 pages.
Reed et al., "Long-Range Motion Detection for Illumination Control," Office Action dated Jan. 30, 2014, for U.S. Appl. No. 12/784,080, 26 pages.
Reed et al., "Long-Range Motion Detection for Illumination Control," Office Action dated Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Low-Profile Pathway Illumination System," Notice of Allowance dated Oct. 14, 2011, for U.S. Appl. No. 12/437,472, 9 pages.
Reed et al., "Low-Profile Pathway Illumination System," Office Action dated May 5, 2011, for U.S. Appl. No. 12/437,472, 24 pages.
Reed et al., "Remotely Adjustable Solid-State Lamp," U.S. Appl. No. 13/875,130, filed May 1, 2013, 65 pages.
Reed et al., "Remotely Adjustable Solid-State Lamp," U.S. Appl. No. 61/641,781, filed May 2, 2012, 65 pages.
Reed et al., "Systems and Methods That Employ Object Recognition," Office Action dated Feb. 9, 2015, for U.S. Appl. No. 13/411,321, 40 pages.
Reed et al., "Systems and Methods That Employ Object Recognition," Office Action dated Aug. 25, 2014, for U.S. Appl. No. 13/411,321, 35 pages.
Reed et al., "Systems and Methods That Employ Object Recognition," Amendment filed Nov. 21, 2014, for U.S. Appl. No. 13/411,321, 20 pages.
Reed et al., "Turbulent Flow Cooling for Electronic Ballast," U.S. Appl. No. 61/088,651, filed Aug. 13, 2008, 23 pages.
Reed, "Apparatus and Method of Energy Efficient Illumination Using Received Signals ," U.S. Appl. No. 13/085,301, filed Apr. 12, 2011, 99 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," Notice of Allowance dated Apr. 23, 2015, for U.S. Appl. No. 12/619,535, 8 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Office Action dated Aug. 14, 2014, for U.S. Appl. No. 12/619,535, 16 pages.
Reed, "Electronic Control to Regulate Power for Solid-State Lighting and Methods Thereof," Office Action dated Feb. 28, 2013, for U.S. Appl. No. 12/619,535, 17 pages.
Reed, "Electronic Control to Regulate Power for Solid-State Lighting and Methods Thereof," Office Action dated Jul. 30, 2013, for U.S. Appl. No. 12/619,535, 15 pages.
Reed, "Electronic Control to Regulate Power for Solid-State Lighting and Methods Thereof," Office Action dated Mar. 26, 2014, for U.S. Appl. No. 12/619,535, 16 pages.
Reed, "Electronic Control to Regulate Power for Solid-State Lighting and Methods Thereof," U.S. Appl. No. 14/806,500, filed Jul. 22, 2015, 52 pages.
Reed, "Electronic Control to Regulate Power for Solid-State Lighting and Methods Thereof," U.S. Appl. No. 14/806,500, filed Jul. 22, 2015.
Reed, "Electrostatic Discharge Protection for Luminaire," U.S. Appl. No. 13/212,074, filed Aug. 17, 2011, 30 pages.
Reed, "Resonant Network for Reduction of Flicker Perception in Solid State Lighting Systems," U.S. Appl. No. 61/527,029, filed Aug. 24, 2011, 41 pages.
Reed, "Solid State Lighting, Drive Circuit and Method of Driving Same," U.S. Appl. No. 13/875,000, filed May 1, 2013, 24 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," Office Acton dated Jan. 2, 2015, for U.S. Appl. No. 13/707,123, 24 pages.

(56) References Cited

OTHER PUBLICATIONS

Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Notice of Allowance dated Jul. 30, 2014, for U.S. Appl. No. 13/085,301, 5 pages.
Reed, "Apparatus and Method of Energy Efficient Illumination Using Received Signals," U.S. Appl. No. 14/557,275, filed Dec. 1, 2014, 92 pages.
Reed, "Apparatus and Method of Energy Efficient Illumination Using Received Signals," Office Action dated Apr. 23, 2014, for U.S. Appl. No. 13/085,301, 12 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Office Action dated Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance dated Nov. 5, 2014, for U.S. Appl. No. 14/329,508, 10 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination," Notice of Allowance dated Apr. 11, 2014, for U.S. Appl. No. 13/943,537, 9 pages.
Reed, "Apparatus and Method of Energy Efficient Illumination," Notice of Allowance dated Apr. 12, 2013, for U.S. Appl. No. 12/784,093, 9 pages.
Reed, "Apparatus and Method of Energy Efficient Illumination," Notice of Allowance dated May 23, 2013, for U.S. Appl. No. 12/784,091, 6 pages.
Reed, "Apparatus and Method of Energy Efficient Illumination," Office Action dated Dec. 5, 2012, for U.S. Appl. No. 12/784,091, 18 pages.
Reed, "Apparatus and Method of Energy Efficient Illumination," Office Action dated Dec. 5, 2012, for U.S. Appl. No. 12/784,093, 13 pages.
Reed, "Apparatus and Method of Energy Efficient Illumination," Office Action dated Aug. 28, 2014, for U.S. Appl. No. 14/329,508, 8 pages.
Reed, "Apparatus and Method of Energy Efficient Illumination," Office Action dated Apr. 24, 2013, for U.S. Appl. No. 12/784,091, 12 pages.
Reed, "Apparatus and Method of Energy Efficient Illumination," Office Action dated Nov. 27, 2013, for U.S. Appl. No. 13/943,537, 8 pages.
Reed, "Apparatus and Method of Energy Efficient Illumination," U.S. Appl. No. 61/333,983, filed May 12, 2010, 57 pages.
Reed, "Apparatus and Method of Energy Application Efficient Illumination," U.S. Appl. No. 61/346,263, filed May 19, 2010, 67 pages.
Reed, "Apparatus and Method of Energy Efficient Illumination," U.S. Appl. No. 14/329,508, filed Jul. 11, 2014, 61 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance dated Sep. 12, 2013, for U.S. Appl. No. 13/212,074, 6 pages.
Reed, "High Efficiency Power Controller for Luminaire," U.S. Appl. No. 14/546,354, filed Nov. 18, 2014, 33 pages.
Reed, "High Efficiency Power Controller for Luminaire," U.S. Appl. No. 61/905,699, filed Nov. 18, 2013, 5 pages.
Reed, "Low Power Photocontrol for Luminaire," U.S. Appl. No. 62/137,666, filed Mar. 24, 2015, 36 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Ambient Sensing and Autonomous Control Capabilities," Office Action dated Dec. 17, 2014, for U.S. Appl. No. 13/786,332, 20 pages.
Reed, "Luminaire With Ambient Sensing and Autonomous Control Capabilities," U.S. Appl. No. 13/786,332, filed Mar. 5, 2013, 86 pages.
Reed, "Luminaire With Ambient Sensing and Autonomous Control Capabilities," U.S. Appl. No. 61/728,150, filed Nov. 19, 2012, 83 pages.
Reed, "Luminaire With Atmospheric Electrical Activity Detection and Visual Alert Capabilities," Notice of Allowance dated Jul. 1, 2014, for U.S. Appl. No. 13/786,114, 9 pages.
Reed, "Luminaire With Atmospheric Electrical Activity Detection and Visual Alert Capabilities," filed Mar. 5, 2013, for U.S. Appl. No. 13/786,114, 52 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Photocontrol for Luminaire Consumes Very Low Power," filed Jul. 24, 2013, for U.S. Appl. No. 13/950,201, 41 pages.
Reed, "Photocontrol for Luminaire Consumes Very Low Power," U.S. Appl. No. 14/158,630, filed Jan. 17, 2014, 71 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," Notice of Allowance dated Sep. 30, 2013, for U.S. Appl. No. 13/592,590, 9 pages.
Reed, "Solid State Hospitality Lamp," U.S. Appl. No. 13/973,696, filed Aug. 22, 2013, 32 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device As a Logic Level Sensor," U.S. Appl. No. 61/764,395, filed Feb. 13, 2013, 48 pages.
Reed, "Systems, Methods, and Apparatuses for Using a High Current Switching Device As a Logic Level Sensor," U.S. Appl. No. 14/179,737, filed Feb. 13, 2014, 48 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.

(56) References Cited

OTHER PUBLICATIONS

Written Opinion dated Nov. 11, 2014, for International Application No. PCT/US2014/047867, 5 pages.
Written Opinion, dated Dec. 13, 2010 for PCT/US2010/035649, 4 pages.
Written Opinion, dated Dec. 15, 2010 for PCT/US2010/035658, 3 pages.
Written Opinion, dated Dec. 28, 2010 for PCT/US2010/035651, 3 pages.
Written Opinion, dated Dec. 30, 2013 for PCT/US2013/058266, 8 pages.
Written Opinion, dated Feb. 26, 2014, for PCT/US2013/070794, 10 pages.
Written Opinion, dated Feb. 27, 2013, for PCT/US2012/065476, 8 pages.
Written Opinion, dated Jan. 14, 2013, for PCT/US2012/052009, 5 pages.
Written Opinion, dated Jul. 9, 2009 for PCT/US2009/043171, 8 pages.
Written Opinion, dated Nov. 19, 2013 for PCT/US2013/052092, 7 pages.
Written Opinion, dated Oct. 8, 2012 for PCT/US2012/033059, 3 pages.
Written Opinion, dated Sep. 30, 2011, for PCT/US2011/021359, 4 pages.
Extended European Search Report dated Oct. 21, 2015, for corresponding EP Application No. 13835001.2-1802, 7 pages.
Korean Office Action and English Translation, dated Nov. 18, 2015, for corresponding KR Application No. 10-2011-7014088, 14 pages.
Reed et al., "Long-Range Motion Detection for Illumination Control," Office Action dated Sep. 17, 2015, for U.S. Appl. No. 14/500,512, 17 pages.
Reed et al., "Long-Range Motion Detection for Illumination Control," Amendment filed Dec. 10, 2015, for U.S. Appl. No. 14/500,512, 18 pages.
Reed et al., "Systems and Methods That Employ Object Recognition," Office Action dated Dec. 7, 2015, for U.S. Appl. No. 13/411,321, 47 pages.
Reed, "Adjustable Output Solid-State Lighting Device," Office Action dated Oct. 5, 2015, for U.S. Appl. No. 13/707,123, 24 pages.
Reed, "Adjustable Output Solid-State Lighting Device," Amendment filed Jan. 8, 2016, for U.S. Appl. No. 13/707,123, 11 pages.
Reed, "High Efficiency Power Controller for Luminaire," Office Action dated Sep. 10, 2015, for U.S. Appl. No. 14/546,354, 15 pages.
Reed, "Luminaire With Switch-Mode Converter Power Monitoring," Notice of Allowance dated Nov. 18, 2015, for U.S. Appl. No. 14/074,166, 9 pages.
Reed, "Solid State Lighting, Drive Circuit and Method of Driving Same," Notice of Allowance dated Aug. 4, 2015, for U.S. Appl. No. 13/875,000, 10 pages.
Reed, "Systems, Methods, and Apparatuses for Using a High Current Switching Device As a Logic Level Sensor," Notice of Allowance for U.S. Appl. No. 14/179,737, dated Nov. 6, 2015, 9 pages.
Extended European Search Report dated Jan. 4, 2016, for corresponding EP Application No. 13823055.2-1802, 7 pages.
Reed et al., "Long-Range Motion Detection for Illumination Control," Office Action dated Mar. 4, 2016, for U.S. Appl. No. 14/500,512, 18 pages.
Reed et al., "Systems and Methods That Employ Object Recognition," Amendment filed Mar. 7, 2016, for U.S. Appl. No. 13/411,321, 16 pages.
Reed, "Adjustable Output Solid-State Lighting Device," Notice of Allowance dated Feb. 25, 2016, for U.S. Appl. No. 13/707,123, 9 pages.
Reed, "High Efficiency Power Controller for Luminaire," Amendment filed Feb. 9, 2016, for U.S. Appl. No. 14/546,354, 11 pages.
Reed, "Low Power Photocontrol for Luminaire," U.S. Appl. No. 14/994,569, filed Jan. 13, 2016, 36 pages.
Reed, "Low Power Photocontrol for Luminaire," U.S. Appl. No. 14/844,944, filed Sep. 3, 2015, 45 pages.
Reed et al., "Luminaire With Adjustable Illumination Pattern," U.S. Appl. No. 14/939,856, filed Nov. 12, 2015, 69 pages.
Korean Office Action and English Translation, dated May 16, 2016, for corresponding KR Application No. 10-2011-7014088, 22 pages.
Reed et al., "Apparatus and Method for Schedule Based Operation of a Luminaire," Amendment filed Jun. 7, 2016, for U.S. Appl. No. 14/552,274, 14 pages.
Reed, "Low Power Photocontrol for Luminaire," Amendment filed Jun. 13, 2016, for U.S. Appl. No. 14/844,944, 10 pages.
Extended European Search Report, dated Apr. 11, 2016, for corresponding European Application No. 16152644.7, 8 pages.
Extended European Search Report, dated May 3, 2016, for corresponding European Application No. 12771286.7, 9 pages.
Reed, "Electronic Control to Regulate Power for Solid-State Lighting and Methods Thereof," Office Action dated May 9, 2016 for U.S. Appl. No. 14/806,500, 18 pages.
Reed, "Low Power Photocontrol for Luminaire," Office Action dated Apr. 27, 2016, for U.S. Appl. No. 14/844,944, 10 pages.
Reed, "Solid State Hospitality Lamp," Office Action dated Apr. 15, 2016, for U.S. Appl. No. 13/973,696, 11 pages.
Korean Office Action dated Nov. 28, 2016, for corresponding KR Application No. 10-2011-7014088, with machine English translation, 12 pages.
Extended European Search Report dated Aug. 25, 2016, for corresponding EP Application No. 14843796.5-1757, 6 pages.
Reed et al., "Apparatus and Method for Schedule Based Operation of a Luminaire" Amendment filed Dec. 7, 2016, for U.S. Appl. No. 14/552,274, 11 pages.
Reed et al., "Systems and Methods That Employ Object Recognition," Notice of Allowance dated Jul. 18, 2016, for U.S. Appl. No. 13/411,321, 15 pages.
Reed, "Apparatus and Method of Energy Efficient Illumination Using Received Signals," Office Action dated Aug. 23, 2016, for U.S. Appl. No. 14/557,275, 23 pages.
Reed, "Low Power Photocontrol for Luminaire," Notice of Allowance dated Aug. 24, 2016, for U.S. Appl. No. 14/844,944, 7 pages.
Amendment, filed Jun. 23, 2017, for U.S. Appl. No. 15/206,019, Reed, "High Efficiency Power Controller for Luminaire," 9 pages.
European Office Action, dated Aug. 11, 2017, for European Application No. 13 823 055.2-1802, 4 pages.
Notice of Allowance, dated Jul. 24, 2017, for U.S. Appl. No. 15/206,019, Reed, "High Efficiency Power Controller for Luminaire," 9 pages.
Notice of Allowance, dated Jun. 14, 2017, for U.S. Appl. No. 14/557,275, Reed, "Apparatus and Method of Energy Efficient Illumination Using Received Signals," 2 pages.
Notice of Allowance, dated Jun. 22, 2017, for U.S. Appl. No. 14/816,754, Reed et al., "Apparatus and Method of Operating a Luminaire ," 11 pages.
Notice of Allowance, dated Nov. 6, 2017, for U.S. Appl. No. 15/496,985, Vendetti et al., "Luminaire Dimming Module Uses 3 Contact Nema Photocontrol Socket," 8 pages.
Reed, "Inrush Current Limiter Circuit," U.S. Appl. No. 15/709,028, filed Sep. 19, 2017, 30 pages.
Reed, "Output Ripple Reduction for Power Converters," U.S. Appl. No. 15/709,022, filed Sep. 19, 2017, 27 pages.
Office Action dated Sep. 19, 2016, for U.S. Appl. No. 14/552,274, Reed et al., "Apparatus and Method for Schedule Based Operation of a Luminaire," 9 pages.
Notice of Allowance dated Mar. 16, 2017, for U.S. Appl. No. 14/552,274, Reed et al., "Apparatus and Method for Schedule Based Operation of a Luminaire," 9 pages.
Office Action dated Feb. 17, 2017, for U.S. Appl. No. 14/939,856, Reed et al., "Luminaire With Adjustable Illumination Pattern," 13 pages.
Office Action dated Mar. 23, 2017, for U.S. Appl. No. 15/206,019, Reed, "High Efficiency Power Controller for Luminaire," 22 pages.
Notice of Allowance dated Mar. 24, 2017, for Reed, "Apparatus and Method of Energy Efficient Illumination Using Received Signals," U.S. Appl. No. 14/557,275, 23 pages.

(56) References Cited

OTHER PUBLICATIONS

Reed, "High Reliability Photocontrol Controls With 0 to 10 Volt Dimming Signal Line and Method," U.S. Appl. No. 62/507,730, filed May 17, 2017, 17 pages.
Vendetti et al., "Luminaire Dimming Module Uses 3 Contact NEMA Photocontrol Socket," U.S. Appl. No. 15/496,985, filed Apr. 25, 2017, 23 pages.

* cited by examiner

ELECTRONIC CONTROL TO REGULATE POWER FOR SOLID-STATE LIGHTING AND METHODS THEREOF

TECHNICAL FIELD

This disclosure generally relates to the field of illumination devices and, more particularly, to regulation of electrical power applied to solid-state lighting in an illumination device.

DESCRIPTION OF THE RELATED ART

With increasing trend of energy conservation and for various other reasons, including replacement of gas-vapor lamps, solid-state lighting has become more and more popular as the source of illumination in a wide range of applications. As generally known, solid-state lighting refers to a type of lighting that emits light from a solid object, such as a block of semiconductor, rather than from a vacuum or gas tube as is the case in traditional lighting. Examples of solid-state lighting include light-emitting diodes (LEDs), organic light-emitting diodes (OLEDs), and polymer light-emitting diodes (PLEDs). Solid-state lighting as compared to traditional lighting generates visible light with reduced parasitic energy dissipation in the form of reduced heat generation. Further, solid-state lighting tends to have increased lifespan compared to traditional lighting. This is because, due to its solid-state nature, solid-state lighting provides for greater resistance to shock, vibration, and wear.

An LED illumination device is a type of solid-state lighting that utilizes LEDs as a source of illumination, and typically has clusters of LEDs in a suitable housing. The LEDs in an LED illumination device typically have very low dynamic resistance, with the same voltage drop for widely-varying currents. Thus, the LEDs cannot be connected directly to most power sources, such as the 120-volt alternating current (AC) mains commonly available in the U.S., without causing damages to the LEDs. LEDs typically conduct current in one direction, and require a current that does not exceed the maximum current rating of the LED.

Two methods have been typically used to limit the current that is applied to LEDs in an illumination device to a safe level. The first method uses an electronic switching ballast that converts the AC input voltage form the power mains into a direct current (DC) regulated current of an acceptable value. The second method uses a string of LEDs coupled in series where a voltage drop of the string equal to the input voltage at the current limit.

An electronic switching ballast that regulates current typically employs a switching current and a magnetic energy storage device such as a series inductor (e.g., in a buck regulator) or transformer (e.g., in a flyback regulator). Various different topologies have been developed in the attempt to obtain high conversion efficiencies. Still, a typical flyback or buck type regulator will have a conversion efficiency of only 60% to 90%, wasting 10% to 40% of the input power in the form of heat.

Electronic switching ballasts tend to be expensive to manufacture because they require high frequency switching components, custom-wound magnetic components, and electrical noise suppression circuitry. Moreover, because of the high frequency required to utilize reasonably sized magnetic components, electronic switching ballasts typically require electro-magnetic interference (EMI) filtering. This unavoidably adds cost and space requirements. Furthermore, robust and relatively expensive components are needed to ensure long life and efficient operation of electronic switching ballasts. In addition, a power factor correction (PFC) circuit is required to meet power factor regulations. If external light dimmers will be used, the electronic switching ballast accordingly will need extra circuitry.

Series-string current control can have very high conversion efficiency, but only for one applied voltage level. If the voltage level of the input power falls below the LED string voltage, the LEDs do not produce the required light emission. If, however, the voltage level of the input power rises above the LED string voltage, excess current flows through the LEDs and may result in damage to the LEDs. Series-string type of solid-state lighting thus requires a "ballast" resistor or active current-limiting circuitry to limit the current in the case of high input voltage. This current-limiting circuitry, nevertheless, eliminates any conversion efficiency advantage that the series-string type of solid-state lighting may have by dissipating the excess power as heat. An additional disadvantage to the series-string type of solid-state lighting used in an AC application is that the LEDs do not begin to emit light until the applied voltage approaches the string voltage. This causes a loss of cost efficiency because the LEDs are not on (i.e., emitting light) throughout the entire AC line cycle. Another disadvantage to the series-string type of solid-state lighting used in an AC application is that the string of LEDs only emits light during one half of the AC cycle, thus requiring the use of two strings of LEDs to produce light over the entire AC cycle. If light is only produced in one half of the cycle, using only one string of LEDs, the light undesirably appears to the eye to flicker at the 30 Hz half cycle frequency.

BRIEF SUMMARY

A regulator device to regulate an input power applied to a plurality of light emitters may be summarized as including a plurality of switches each of which selectively electrically couples a respective number of the light emitters to receive the input power when the switch is deactivated; and a control circuit coupled to receive the input power and controllingly coupled to the plurality of switches, the control circuit configured to sense an operational parameter of the input power, the control circuit to deactivate a number of the switches to electrically couple the respective light emitters to the input power and a first number of the light emitters responsive to the sensed operational parameter of the input power, and to adjust the number of the switches deactivated responsive to a change in the sensed operational parameter of the input power, where the first number of the light emitters are coupled to the input power regardless of the sensed operational parameter of the input power.

The control circuit may deactivate a number of the switches to electrically couple the respective light emitters in series to the input power to emit light responsive to the sensed operational parameter of the input power, and wherein the control circuit may adjust the number of the switches deactivated to adjust the number of light emitters electrically coupled in series to the input power responsive to a change in the sensed operational parameter of the input power. The control circuit may sense at least one of a current value and a voltage value of the input power applied to the number of light emitters electrically coupled in series to the input power. Each of the plurality of switches may be electrically coupled to a respective one of the light emitters. A first switch of the plurality of switches may be selectively operable to electrically short a first number of the light emitters, wherein a second switch of the plurality of switches may be selectively operable to electrically short a second number of the light emitters, the second number being twice the first number. The control circuit may adjust the number of switches deactivated to adjust the number of the respective light emitters electrically coupled in series to the input power to achieve a target voltage drop across the total number of light emitters electrically coupled in series to the input power responsive to a change in the sensed operational parameter of the input power. The control circuit may adjust the number of switches deactivated to adjust the number of the respective light emitters electrically coupled in series to the input power to achieve a target current value of a current flowing through the total number of light emitters electrically coupled in series to the input power responsive to a change in the sensed operational parameter of the input power. The control circuit may include a microcontroller, the microcontroller activates and deactivates a number of the switches to adjust a total number of the plurality of light emitters electrically coupled in series to the input power responsive to the sensed operational parameter of the input power. The control circuit may include an analog-to-digital converter (ADC) to activate and deactivate a number of the switches to adjust a total number of the plurality of light emitters electrically coupled in series to the input power responsive to the sensed operational parameter of the input power. The control circuit may include a plurality of comparators each of which is electrically coupled to a respective number of the switches to activate and deactivate the respective number of the switches to adjust a total number of the plurality of light emitters electrically coupled in series to the input power responsive to the sensed operational parameter of the input power. The control circuit may include a current sensor to sense a current value of the input power, and wherein the current sensor may include one of a resistive sensor, a Hall-effect sensor, and a sense-coil type sensor. The control circuit may include a plurality of pulse width modulation (PWM) modules each of which electrically coupled to drive a respective one of the plurality of switches. At least one of the PWM modules may drive the respective switch with a pulse stream of increasing duty cycle to activate the respective switch. At least one of the PWM modules may drive the respective switch with a pulse stream of decreasing duty cycle to deactivate the respective switch.

The control circuit may further include a triangle wave generator to provide a triangular-wave signal to the PWM modules.

The regulator device may further include a voltage regulator to provide a regulated input power to power the control circuit, the voltage regulator electrically coupled to receive power from a base string of light emitters of the plurality of light emitters that is coupled to receive the input power. The control circuit and the switches may be parts of a processor.

An illumination device may be summarized as including a first plurality of light emitters coupled to an input power; a second plurality of light emitters; and a control system electrically coupled to the second plurality of light emitters and the input power, the control system to sense an operational parameter of the input power, the control system configured to electrically couple a number of the second plurality of light emitters in series to the input power and with the first plurality of light emitters responsive to the sensed operational parameter of the input power exceeding a first threshold value.

The illumination device may further include a rectifier circuit coupled to receive an alternating current (AC) power and the control system to rectify the AC power to provide the input power in direct current (DC) form to the control system, wherein the control system is configured to measure a waveform of the AC power.

The illumination device may further include a rectifier circuit coupled to receive an alternating current (AC) power and the control system to rectify the AC power to provide the input power in direct current (DC) form to the control system, the rectifier circuit including a bridge rectifier having at least one light-emitting diode (LED). The control system may sense at least one of a current value and a voltage value of the input power and electrically couples a number of the second plurality of light emitters in series to the input power and with the first plurality of the light emitters responsive to the sensed at least one of the current value and the voltage value of the input power exceeding the respective threshold current value or threshold voltage value. The control system may electrically couple all of the second plurality of light emitters in series to the input power and with the first plurality of light emitters responsive to the sensed operational parameter of the input power exceeding a second threshold value that is greater than the first threshold value. The control system may include a microcontroller and a plurality of transistors each of which is electrically coupled to the microcontroller to be controlled thereby, wherein the microcontroller may deactivate at least one of the transistors to electrically couple a number of the second plurality of light emitters in series to the input power and with the first number of the light emitters responsive to the sensed operational parameter of the input power being between the first threshold value and a second threshold value. The control system may include an analog-to-digital converter (ADC) and a plurality of transistors each of which is electrically coupled to the ADC to be controlled thereby, wherein the ADC may deactivate at least one of the transistors to electrically couple the a number of the second plurality of light emitters in series to the input power and with the first plurality of light emitters responsive to the sensed operational parameter of the input power being between the first threshold value and a second threshold value. The control system may include a plurality of comparators and a plurality of transistors, each of the comparators controllingly coupled to a respective number of the transistors, each of the transistors electrically coupled to a respective number of the second plurality of light emitters, wherein each of the comparators compares the sensed operational parameter of the input power to a respective threshold value and deactivates the respective transistors to electrically couple the respective number of the second plurality of light emitters in series to the input power and with the first plurality of light emitters responsive to the sensed operational parameter of the input power being between the respective threshold value and a second threshold value. The control system may include a current sensor to sense a current value of the input power, and wherein the current sensor may include one of a resistive sensor, a Hall-effect sensor, and a sense-coil type sensor. The light emitters may include solid-state light emitters. The light emitters may include LEDs.

The illumination device may further include an energy storage element coupled to an output of the rectifier circuit to provide a substantially constant DC voltage for the light emitters.

The illumination device may further include a voltage regulator to provide a regulated input power to power the control system, the voltage regulator electrically coupled to receive power from the first plurality of light emitters. The voltage regulator may be coupled to a first node in a base string of light emitters formed by the first plurality of light emitters, at least one of the light emitters in the base string being between the first node and an electrical ground to provide a DC voltage to the voltage regulator.

The illumination device may further include a rectifier electrically coupled between the voltage regulator and the first plurality of light emitters to rectify the power received by the voltage regulator from the first plurality of light emitters; and an energy storage element electrically coupled between the rectifier and the voltage regulator. The control system and at least one of the light emitters may be parts of an LED-array light source. The control system and at least one of the light emitters may be parts of a monolithic LED light source.

An illumination device may be summarized as including a plurality of light emitters, a first number of light emitters of the plurality of light emitters being electrically coupled in series to an input power; a plurality of switches which when deactivated electrically couple a respective number of the light emitters to the input power in addition to the first number of the light emitters; and a control circuit controllingly coupled to the plurality of switches to activate and deactivate the switches in response to a sensed operational parameter of the input power being greater than a first threshold value.

The illumination device may further include a rectifier circuit coupled to an alternating current (AC) power to rectify the AC power and coupled to provide the input power in direct current (DC) form to the control circuit and the first number of the light emitters, wherein the control circuit is configured to measure a waveform of the AC power.

The illumination device may further include a rectifier circuit coupled to an alternating current (AC) power to rectify the AC power and coupled to provide the input power in direct current (DC) form to the control circuit and the first number of the light emitters, the rectifier circuit including a bridge rectifier having at least one light-emitting diode (LED). A first switch of the plurality of switches may be electrically coupled to short a second number of the light emitters, wherein a second switch of the plurality of switches may be electrically coupled to short a third number of the light emitters, the third number being twice the second number. Each of the plurality of switches may be electrically coupled to short a respective one of the light emitters when activated. The control circuit may activate all of the switches responsive to the sensed operational parameter of the input power being below the first threshold value. The control circuit may deactivate a first number of the switches responsive to the sensed operational parameter of the input power being at a first value above the first threshold value. The control circuit may deactivate a first number plus a second number of the switches responsive to the sensed operational parameter of the input power being at a second value above the first threshold value, the second value being greater than the first value. The control circuit may deactivate all of the switches responsive to the sensed operational parameter of the input power being above a second threshold value, the second threshold value being greater than the first threshold value. The plurality of light emitters may include a plurality of solid-state light emitters. The plurality of light emitters may include a plurality of LEDs.

The illumination device may further include an energy storage element coupled to an output of the rectifier circuit to provide a substantially constant DC voltage for the light emitters. The control circuit may include a current sensor to sense a current value of the input power, and wherein the current sensor may include one of a resistive sensor, a Hall-effect sensor, and a sense-coil type sensor. The control circuit may include a plurality of pulse width modulation (PWM) modules each of which electrically coupled to drive a respective one of the plurality of switches. At least one of the PWM modules may drive the respective switch with a pulse stream of increasing duty cycle to activate the respective switch. At least one of the PWM modules may drive the respective switch with a pulse stream of decreasing duty cycle to deactivate the respective switch.

The control circuit may further include a triangle wave generator to provide a triangular-wave signal to the PWM modules.

The illumination device may further include a voltage regulator to provide a regulated input power to power the control circuit, the voltage regulator electrically coupled to receive power from the first number of light emitters. The voltage regulator may be coupled to a first node in a base string of light emitters formed by the first number of light emitters, at least one of the light emitters in the base string being between the first node and an electrical ground to provide a DC voltage to the voltage regulator.

The illumination device may further include a rectifier electrically coupled between the voltage regulator and the first number of light emitters to rectify the power received by the voltage regulator from the first number of light emitters; and an energy storage element electrically coupled between the rectifier and the voltage regulator. The control circuit and the switches may be parts of a processor. The control circuit and at least one of the light emitters may be parts of an LED-array light source. The control circuit and at least one of the light emitters may be parts of a monolithic LED light source.

A method to regulate an input power may be summarized as including determining a number of light emitters of a plurality of light emitters to be electrically coupled the input power based on an operational parameter of the input power; and electrically coupling the number of light emitters of the plurality of light emitters to the input power based on the operational parameter of the input power, the number of the light emitters coupled to the input power being between a value M and a value N where the value N is equal to a total quantity of light emitters in the plurality of light emitters, the value M being a positive number greater than zero but less than the value N.

The method may further include sensing the operational parameter of the input power. Electrically coupling a number of light emitters of the plurality of light emitters to the input power based on the operational parameter of the input power may include electrically coupling a number M of the light emitters in series to the input power in response to the operational parameter of the input power being equal to or less than a threshold value. Electrically coupling a number of light emitters of the plurality of light emitters to the input power based on the operational parameter of the input power may include electrically coupling a number R of the light emitters in series to the input power responsive to the sensed operational parameter of the input power being equal to or greater than a threshold value, where the number R is a positive number between M and N. Electrically coupling a number of light emitters of the plurality of light emitters to the input power based on the operational parameter of the input power may include varying the number of the light emitters electrically coupled in series to the input power to be between the value M and the value N by a variable increment responsive to the sensed operational parameter of the input power, the variable increment ranging between 1 and a value equal to N−M. Varying the number of the light emitters electrically coupled in series to the input power to be between the value M and the value N by a variable increment may include varying the number of the light emitters electrically coupled in series to the input power to be between the value M and the value N by a number of 2 to the $P^{th}$ power, where P is a positive integer greater than or equal to zero. Electrically coupling a number of light emitters of the plurality of light emitters to the input power based on the operational parameter of the input power may include varying the number of the light emitters electrically coupled in series to the input power to be between the value M and the value N by an increment or decrement equal to 1 responsive to the sensed operational parameter of the input power being greater than a threshold value. Electrically coupling a number of light emitters of the plurality of light emitters to the input power based on the operational parameter of the input power may include deactivating a number of a plurality of switches to electrically couple a respective number of the light emitters to the input power in response to the operational parameter of the input power being greater than a threshold value, the respective number of the emitters coupled to the input power being between the value M and the value N. Sensing the operational parameter of an input power may include sensing at least one of a current value and a voltage value of the input power. Electrically coupling a number of light emitters of a plurality of light emitters to the input power may include electrically coupling a number of solid-state light emitters of a plurality of solid-state light emitters to the input power. Electrically coupling a number of light emitters of a plurality light emitters to the input power may include electrically coupling a number of light-emitting diodes (LEDs) of a plurality of LEDs to the input power.

A method to regulate an input power may be summarized as including electrically coupling a number of light emitters of a plurality of light emitters to the input power; and maintaining a first operational parameter of the input power proximate to a target value by adjusting a total number of light emitters of the plurality of light emitters electrically coupled to the input power responsive to a variation in a second operational parameter of the input power. Electrically coupling a number of light emitters of a plurality of light emitters to an input power may include electrically coupling a number of solid-state light emitters of a plurality of solid-state light emitters to the input power. Electrically coupling a number of light emitters of a plurality of light emitters to the input power may include electrically coupling a number of light-emitting diodes (LEDs) of a plurality of LEDs to the input power. Maintaining a first operational parameter of the input power proximate to a target value may include maintaining a current value of the input power proximate to a target current value. Adjusting a total number of light emitters of the plurality of light emitters electrically coupled to the input power responsive to a variation in a second operational parameter of the input power may include electrically coupling a first number of light emitters of the plurality of light emitters in series to the input power responsive to the second operational parameter of the input power being equal to or less than a first threshold value.

The method may further include electrically coupling a variable number of light emitters of the plurality of light emitters in series to the input power responsive to the second operational parameter of the input power being between the first threshold value and a second threshold value that is greater than the first threshold value, where the variable number is greater than the first number.

The method may further include electrically coupling all of the light emitters of the plurality of light emitters in series to the input power responsive to the second operational parameter of the input power exceeding the second threshold value. Adjusting a total number of light emitters of the plurality of light emitters electrically coupled to the input power responsive to a variation in a second operational parameter of the input power may include adjusting the number of light emitters of the plurality of light emitters electrically coupled in series to the input power proportionally to the variation in the second operational parameter of the input power. Adjusting a total number of light emitters of the plurality of light emitters electrically coupled to the input power responsive to a variation in a second operational parameter of the input power may include electrically coupling substrings of light emitters of the plurality of light emitters in series to the input power responsive to a variation in the second operational parameter of the input power. Maintaining a first operational parameter of the input power proximate to a target value by adjusting a total number of light emitters of the plurality of light emitters electrically coupled to the input power responsive to a variation in a second operational parameter of the input power may include maintaining the first operational parameter of the input power proximate to the target value by adjusting a total number of light emitters of the plurality of light emitters electrically coupled in series to the input power to achieve a voltage drop across the number of light emitters electrically coupled in series to the input power responsive to a variation in the second operational parameter of the input power. The first and the second operational parameters of the input power may be the same as one another. The first and the second operational parameters of the input power may be different from one another.

An illumination device may be summarized as including a light emitting diode-based rectifier that includes a plurality of diodes arranged as a bridge circuit, at least one of the plurality of diodes being a light emitting diode, the bridge circuit coupleable to an alternating current (AC) power and operable to rectify the AC power and provide a direct current (DC) power output. The bridge circuit may include four legs, each of the legs including at least one light emitting diode.

Figure 1A:
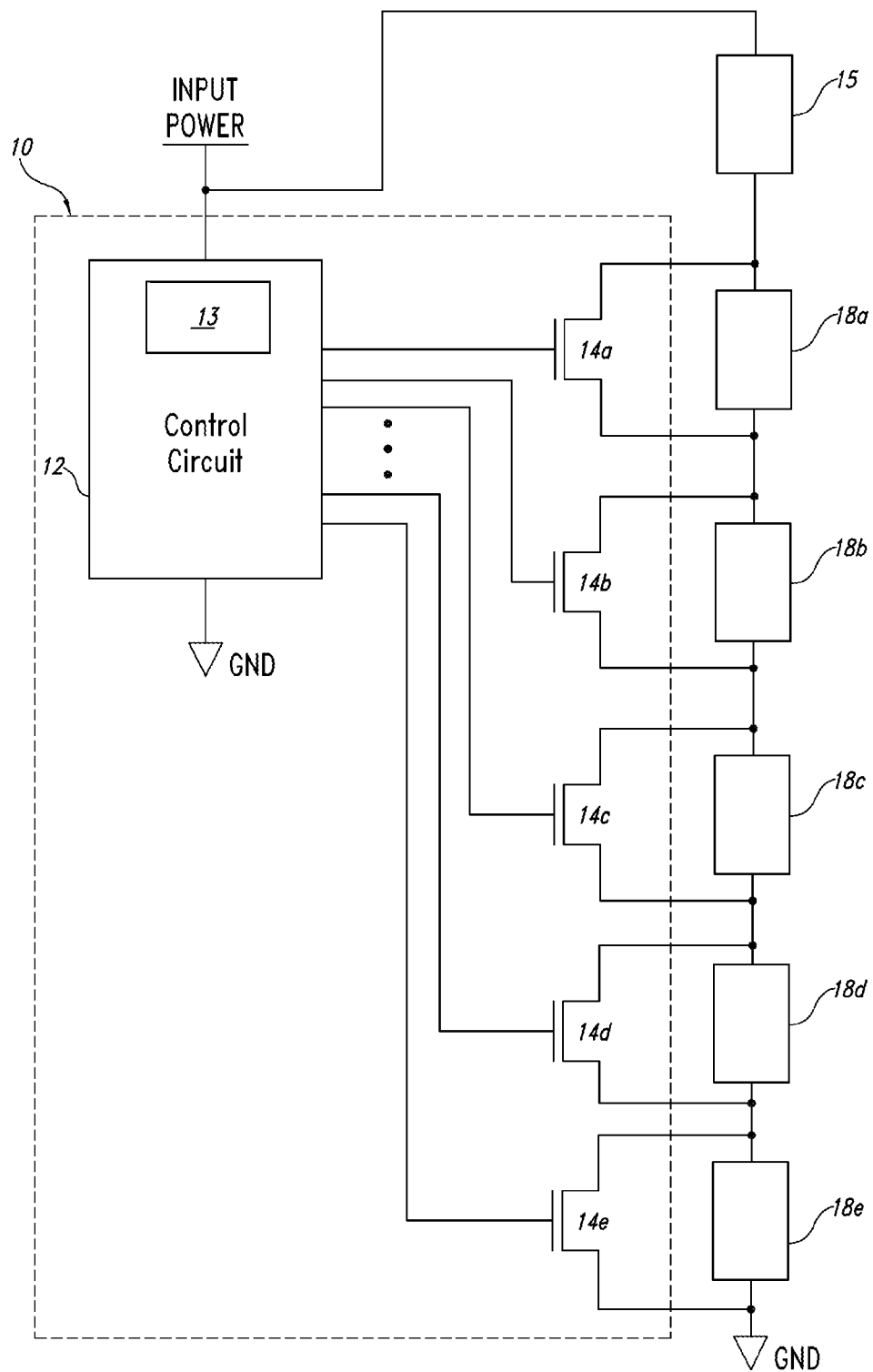
FIG. 1A is a diagram showing a regulator device that regulates an input power applied to a plurality of light emitters according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting fixtures, power generation and/or power system for lighting have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings and Abstract of the Disclosure provided herein are for convenience only and do not interpret the scope or meaning of the embodiments.

As illustrated in FIG. 1A, a regulator device 10 that regulates an input power applied to a finite number of light emitters, grouped into a base string 15 and substrings 18a-18e, may include a control circuit 12 and a plurality of switches 14a-14e coupled to the control circuit 12. In one embodiment, the control circuit may comprise a semiconductor integrated circuit (e.g., a processor). In another embodiment, the control circuit 12 and the switches 14a-14e may be integral parts of a processor. In yet another embodiment, the control circuit 12, the switches 14a-14e, and the light emitters (including the base string 15 and the substrings 18a-18e) may be integral parts of a processor.

Each of the base string 15 and substrings 18a-18e may include one or more light emitters coupled in series. The input power may be a DC input power. The control circuit 12 may be coupled to the input power, the plurality of switches 14a-14e, and the base string 15. When coupled to the DC input power, the light emitters in the base string 15 and substrings 18a-18e will emit light provided that voltage drop across the string is at least the string forward voltage, or the sum of the minimum voltage required for each light emitter to emit light for the string.

Each of the plurality of switches 14a-14e may be electrically coupled across a respective string 18a-18e. For example, switch 14a may be electrically coupled across the substring 18a, switch 14b may be electrically coupled across the substring 18b, switch 14c may be electrically coupled across the substring 18c, switch 14d may be electrically coupled across the substring 18d, and switch 14e may be electrically coupled across the substring 18e. In various embodiments, there may be tens or dozens of substrings of light emitters and correspondingly tens or dozens of switches, but only six strings (i.e., the base string 15 and substrings 18a-18e) and five switches (i.e., the switches 14a-14e) are shown in FIG. 1A for simplicity and to avoid unnecessarily obscuring the figure. The same principle also applies to FIGS. 2-5.

In one embodiment, each of the switches 14a-14e may be a solid-state switch. In one embodiment, each of the switches 14a-14e may be a transistor, such as, for example, an insulated-gate bipolar transistor (IGBT), a metal-oxide-semiconductor field-effect transistor (MOSFET) or a bipolar junction transistor (BJT). Typically, when a transistor is activated, it conducts current; when the transistor is deactivated, no current flows through it. Thus, when a switch 14a-14e is activated, it conducts current by creating a path of relatively minimal resistance and thereby electrically shoring the respective substring 18a-18e out of the resultant string of light emitters that is coupled in series to the input power. Likewise, when a switch 14a-14e is deactivated, current will flow through the respective substring 18a-18e and thereby electrically coupling the respective substring 18a-18e into the resultant string of light emitters that is coupled in series to the input power.

The control circuit 12 is capable of sensing an operational parameter of the input power. The operational parameter sensed by the control circuit 12 may be the current value of the input power in one embodiment or the voltage value of the input power in another embodiment. Alternatively, the control circuit 12 may sense both the current value and voltage value of the input power.

In one embodiment, a current sensor 13 is used in the control circuit 12 and is electrically coupled in series with the resultant string of light emitters. This current sensor 13 may be a resistive sensor, a Hall-effect sensor, or a sense-coil type sensor, for example. In an embodiment, this current sensor 13 is a "high side" current sensor that enables the most negative end of the resultant string to be connected to ground. Alternatively, the current sensor 13 may be placed anywhere in the resultant string, and may be a "low side" (or grounded) current sensor or sense resistor.

Alternatively, the voltage of the input power may be sensed. Accordingly, in one embodiment, the number of light emitters in the resultant string is adjusted to match the input voltage based on known characteristics of the particular light emitters (e.g., LEDs) used. Modern high-flux LEDs have good matching of LED forward voltage ($V_f$) at a given current, and knowledge of the $V_f$ may be utilized to calculate the number of LEDs required in the resultant string. However, this approach of voltage sensing may be less ideal due to the variation in LED $V_f$ over temperature and may result in somewhat less accuracy of current control than the approach with current sensing.

In one embodiment, the control circuit 12 electrically couples at least the base string 15 to the input power, regardless of the value of the sensed operational parameter of the input power, and activates all of the switches 14a-14e. This way, there will always be at least the base string 15 of light emitters electrically coupled to the input power to emit light. As the operational parameter of the input power varies, the control circuit 12 may dynamically deactivate one or more of the switches 14a-14e to increase the number of light emitters in the resultant string of light emitters electrically coupled in series to the input power.

For example, in one embodiment, when the operational parameter of the input power exceeds a first threshold value by within a first amount, the control circuit 12 may deactivate the switch 14a while keeping the switches 14b-14e activated to additionally electrically couple the substring 18a in series with the base string 15 to the input power. When the operational parameter of the input power exceeds the first threshold value by more than the first amount but within a second amount, the control circuit 12 may deactivate the switches 14a-14b while keeping the switches 14c-14e activated to additionally electrically couple the substrings 18a-18b in series with the base string 15 to the input power. When the operational parameter of the input power exceeds the first threshold value by more than the second amount but within a third amount, the control circuit 12 may deactivate the switches 14a-14c while keeping the switches 14d-14e activated to additionally electrically couple the substrings 18a-18c in series with the base string 15 to the input power. When the operational parameter of the input power exceeds the first threshold value but within a second threshold value that is greater than the first threshold value, the control circuit 12 may deactivate the switches 14a-14d while keeping the switch 14e activated to additionally electrically couple the substrings 18a-18e in series with the base string 15 to the input power. When the operational parameter of the input power exceeds the second threshold value, the control circuit 12 may deactivate the switches 14a-14e to additionally electrically couple the substrings 18a-18e in series with the base string 15 to the input power.

In an alternative embodiment, the control circuit 12 may deactivate a different one or combination of the switches 14a-14e to electrically couple an appropriate number of the light emitters in series to the input power corresponding to the value of the operational parameter of the input power in relation to the first and second threshold values. This approach can be especially helpful when each of the substrings 18a-18e includes a different number of light emitters, as will be explained in more detail below.

In one embodiment, the control circuit 12 may include a microcontroller that is electrically coupled to the switches 14a-14e to activate and deactivate the switches 14a-14e, thereby controlling which one or ones of the substrings 18a-18e to be electrically coupled in series with the base string 15 to receive the input power to emit light. In an embodiment, the firmware operation for the microcontroller may be as follows:

> Interrupt at zero crossing of AC line
> Activate all switches to set light emitter string to a minimum length (control byte = xxx11111)
>   Begin
>     Measure light emitter string current
>     If current > LightEmitterCurrentNormal − 6% then decrement control byte
If current < LightEmitterCurrentNormal + 6%
then increment control byte
Output control byte to switches
Delay to allow switches to settle before next current measurement
Repeat In this embodiment, a five-bit section of the control byte is used to control the five switches. When a bit is set to 1, the switch is deactivated (turned off) and the respective light emitter substring electrically coupled to that switch is added to the base string 15. In contrast, then a bit is set to 0, the switch is activated (turned on) and the respective light emitter string electrically coupled to that switch is shorted or bypassed from the full string. Therefore, by setting the appropriate bit or bits in the control byte, one or more of the substrings 14a-14e may be added to or removed from the resultant string of light emitters that receives the input power to emit light.

The control circuit 12 may use more complex firmware that includes current hysteresis to be used such that noise, switching transients, switching time of the solid-state switches or other disturbances will not result in false switching based on instantaneous current sensor readings.

Figure 1B:
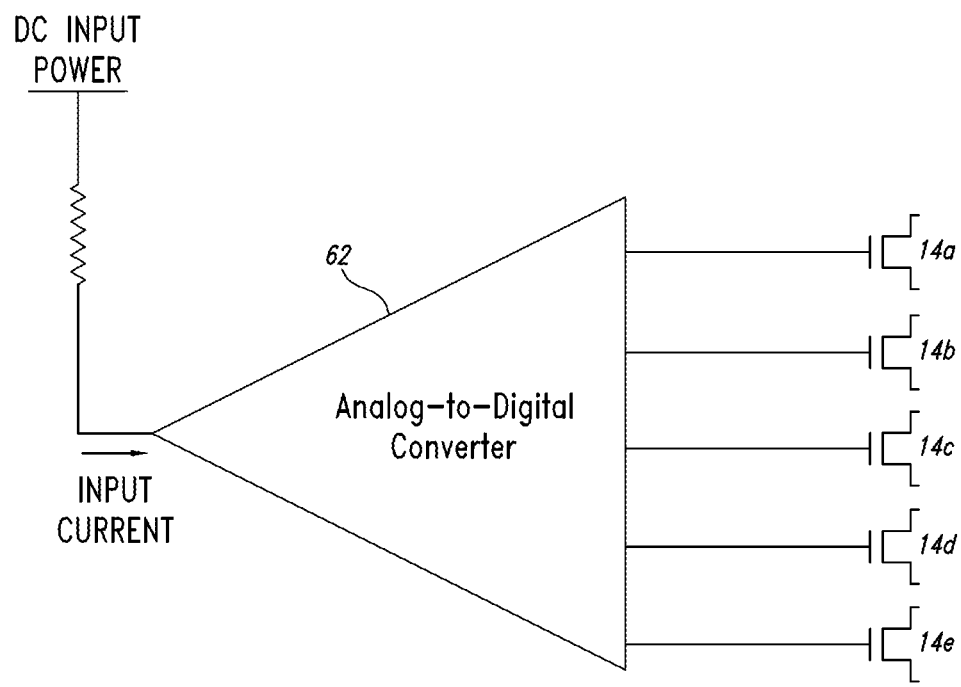
FIG. 1B is a diagram showing a portion of a control circuit of the regulator device of FIG. 1A according to one non-limiting illustrated embodiment.

In another embodiment, the control circuit 12 may include an analog-to-digital converter (ADC) 62, as illustrated in FIG. 1B. The ADC 62 is electrically coupled to the switches 14a-14e to activate and deactivate the switches 14a-14e, thereby controlling which one or ones of the substrings 18a-18e to be electrically coupled in series with the base string 15 to receive the input power to emit light. The ADC 62 receives an analog signal, such as a current derived from the input power, as input. The ADC 62 converts the analog signal into a digital signal as output to activate one or more of the switches 14a-14e and deactivate the remainder of the switches 14a-14e. For instance, if the input current results in the ADC 62 outputting a digital signal that activates the switches 14a and 14d and deactivates the switches 14b, 14c, and 14e, then substrings 18a and 18d will be bypassed while substrings 18b, 18c, and 18e will be electrically coupled in series with the base string 15 to receive the input power to emit light.

Figure 1C:
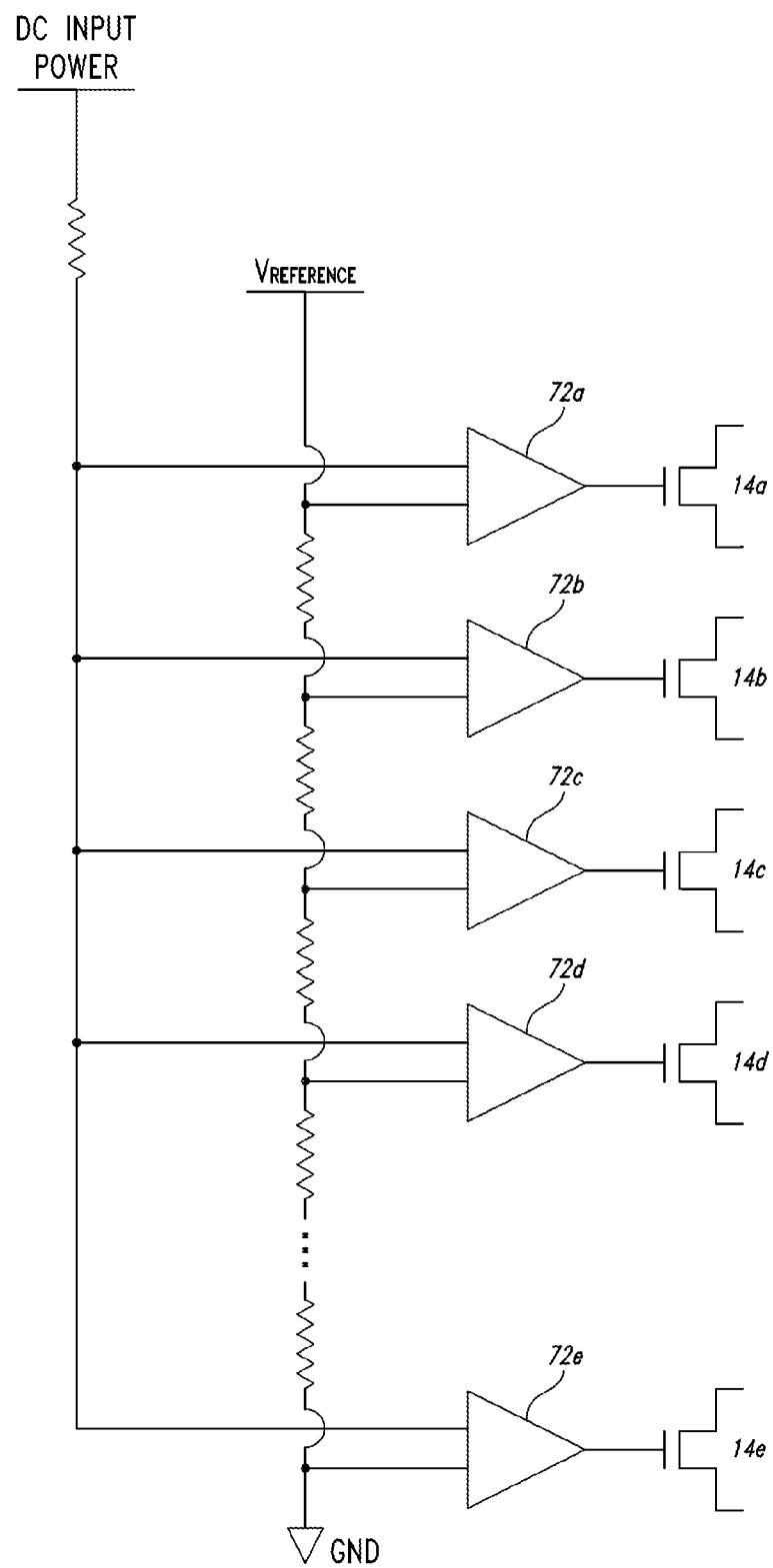
FIG. 1C is a diagram showing a portion of a control circuit of the regulator device of FIG. 1A according to another non-limiting illustrated embodiment.

In yet another embodiment, the control circuit 12 may include one or more analog controllers, such as a plurality of comparator circuits 72a-72e, as illustrated in FIG. 1C. Each of the comparator circuits 72a-72e is electrically coupled to a respective one of the switches 14a-14e to activate and deactivate the switches 14a-14e, thereby controlling which one or ones of the substrings 18a-18e to be electrically coupled in series with the base string 15 to receive the input power to emit light. Each of the comparator circuits 72a-72e receives an input power signal, such as a voltage related to the input power, as one input and receives a respective reference signal, such as a respective reference voltage derived from a voltage reference $V_{Reference}$, as the other input. Each of the comparator circuits 72a-72e compares the two input signals and either activates or deactivates the corresponding switch 14a-14e. This, in turn, electrically couples zero or more of the substrings 18a-18e in series with the base string 15 to receive the input power to emit light.

When the substrings 18a-18e are switched in and out by the control circuit 12, the switching action may result in noticeable flicker of the light output of an illumination system in which the regulator device 10 is used. In one embodiment, the switching is done by increasing a pulse width modulation (PWM) of the drive to the controlling switches 14a-14e such that those switches 14a-14e to be activated receive a pulse stream of increasing duty cycle while those switches 14a-14e to be deactivated receive a pulse stream of decreasing duty cycle. This causes the light emitted from the substring being switched out to gradually decrease while the light emitted from the substring being switched in to gradually increase. Besides, by using PWM technique to drive the switches 14a-14e with a pulse stream of increasing or decreasing duty cycle, not only the flicker is removed but the average power to the substrings 18a-18e is also limited to less than the maximum limit.

Figure 1D:
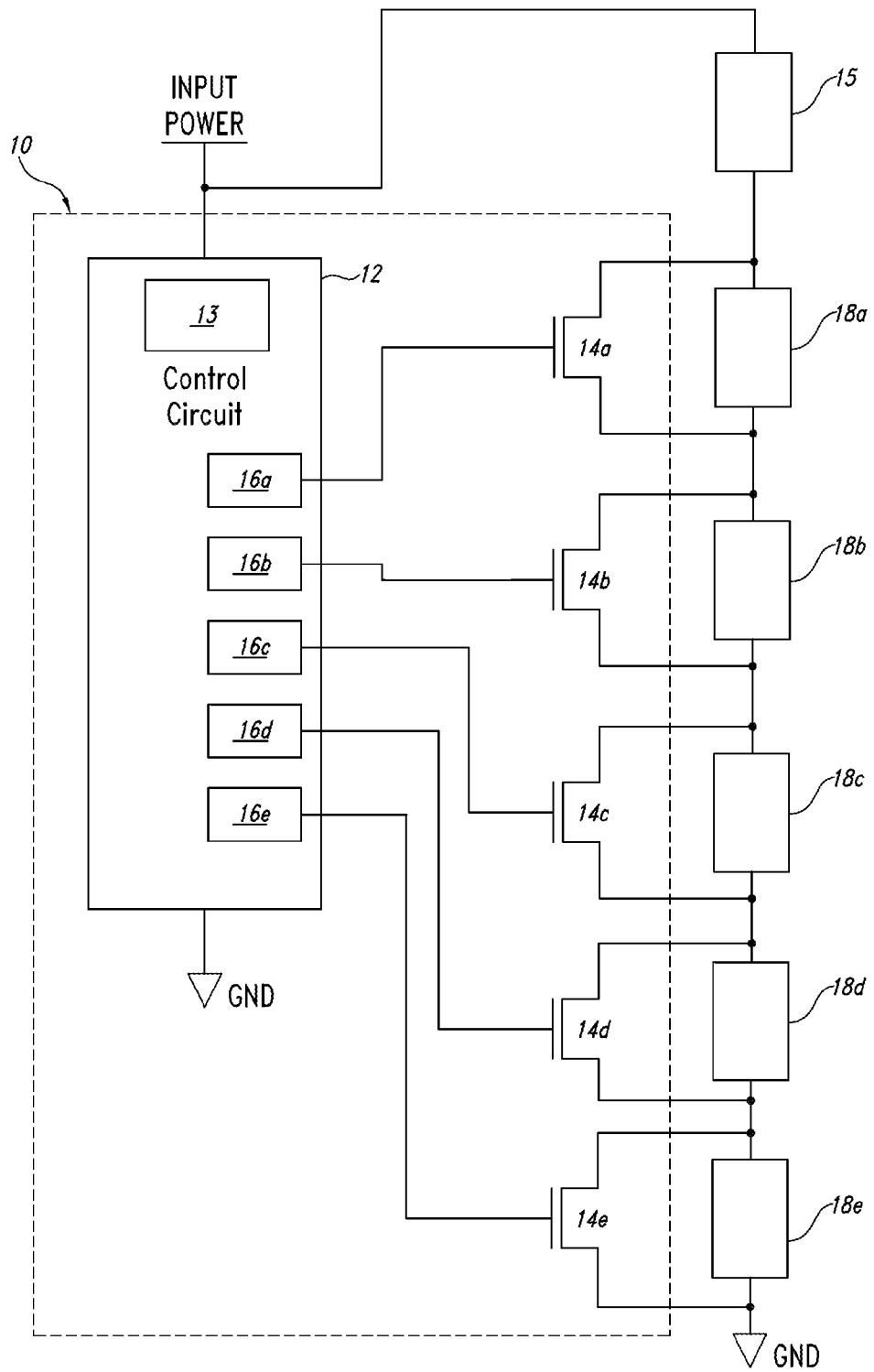
FIG. 1D is a diagram showing the regulator device of FIG. 1A according to another non-limiting illustrated embodiment.

As illustrated in FIG. 1D, in one embodiment, the regulator device 10 of FIG. 1A may include a plurality of PWM modules 16a-16e, each of which driving a respective one of the plurality of switches 14a-14e in the manner described above. In another embodiment, the PMW modules 16a-16e may be separate from the control circuit 12 but electrically coupled to the control circuit 12.

Figure 1E:
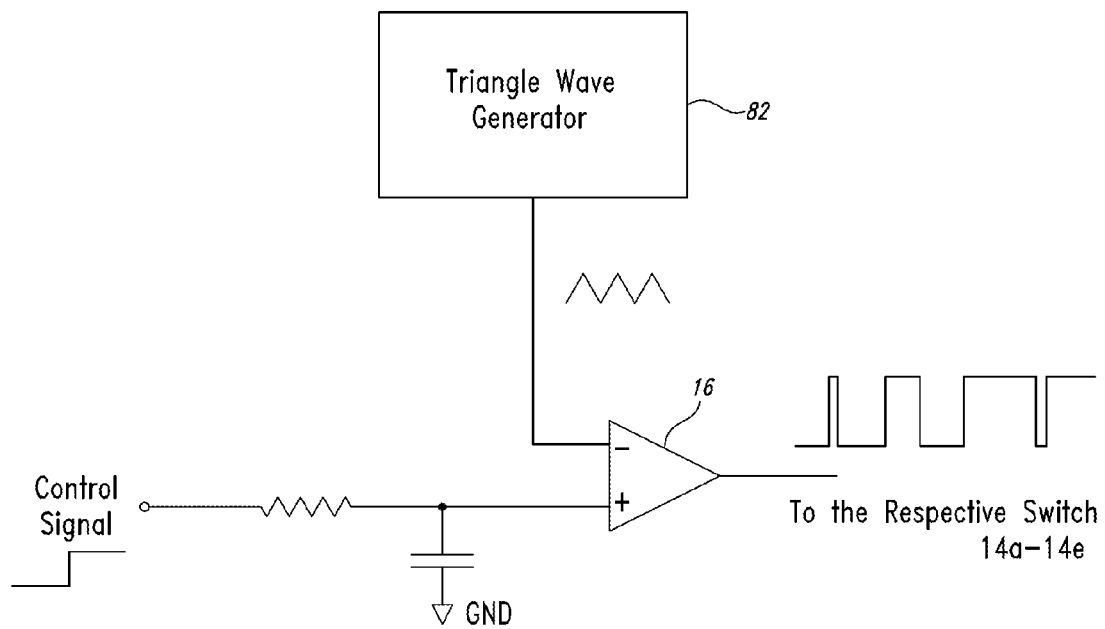
FIG. 1E is a diagram showing a portion of a control circuit of the regulator device of FIG. 1D according to one non-limiting illustrated embodiment.

As illustrated in FIG. 1E, each of the PMW modules 16a-16e (shown as the PWM module 16) may receive a control signal from the control circuit 12 at a first input and a triangular-wave signal from a triangle wave generator 82 at a second input to drive its respective switch 14a-14e. The triangle wave generator 82 may be an integral part of the control circuit 12 in one embodiment, or separate from the control circuit 12 in another embodiment. In one embodiment, some or all of the control circuit 12, the switches 14a-14e, the PWM modules 16a-16e, and the triangle wave generator 82 may be integral parts of a processor. In the interest of brevity, the detailed structure and operation of the PWM modules 16a-16e and the triangle wave generator 82 will neither be described nor illustrated since pulse width modulators and triangle wave generators are well known in the art.

In one embodiment, the voltage required to power the control circuit 12 is derived from a substring of light emitters that is part of the base string 15. Given that the base string 15 is coupled to receive the input power regardless of the current value or voltage value of the input power, the base string 15 is always powered. Accordingly, the substring of the base string 15 powering the control circuit 12 is always on (i.e., receiving power).

Figure 1F:
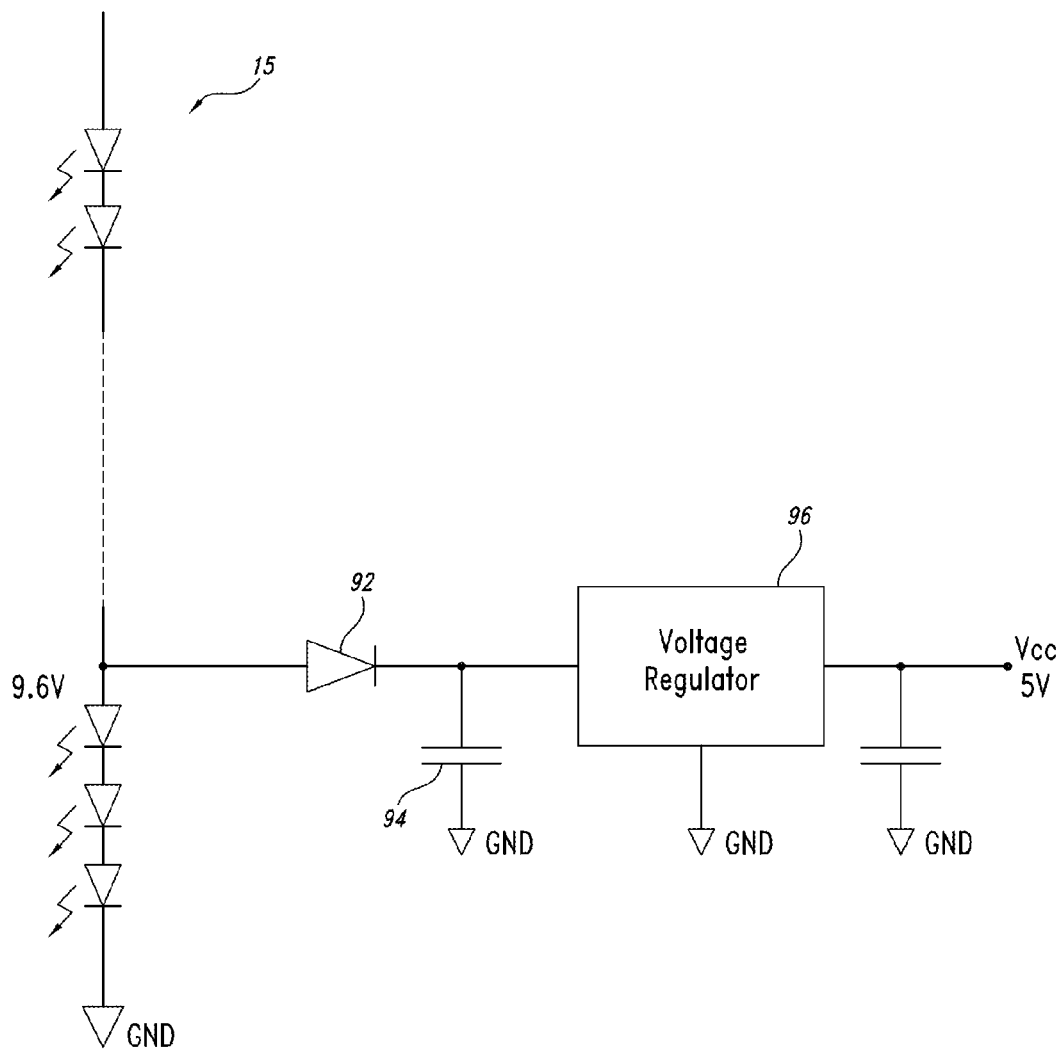
FIG. 1F is a diagram showing an arrangement to provide power to a control circuit of the regulator device of FIGS. 1A and 1D according to one non-limiting illustrated embodiment.

As illustrated in FIG. 1F, a rectifier 92 and an energy storage element 94, such as a storage capacitor, may be used to produce a DC voltage that is loosely regulated by the forward drop of the substring of light emitters. The light emitters may be LEDs, as shown in FIG. 1F, or solid state light emitters in another embodiment. In one embodiment, a substring of three LEDs is used to produce a DC voltage of approximately 9.6V. This DC voltage may then be more accurately regulated by a conventional voltage regulator 96 to the required supply voltage, for example, 5.0V. The advantage of this arrangement is that the raw DC voltage is close to the final regulated voltage, resulting in low energy loss in the voltage regulator 96. In one embodiment, some or all of the control circuit 12, the voltage regulator 96, the rectifier 92, and the energy storage element 94 may be integral parts of a processor.

By varying the number of light emitters electrically coupled to the input power in series corresponding to the sensed current and/or voltage of the input power, the regulator device 10 regulates the current flowing through the resultant string of light emitters that is electrically coupled to the input power. In other words, the regulator device 10 does so by selectively deactivating and activating one or more of the switches 14a-14e based on the sensed current and/or voltage to electrically couple the appropriate strings 18a-18e, in series with the base string 15, to the input power. For example, if each light emitter has a forward voltage drop of 3.2 volts and the DC input power has a line voltage of 120 volts, then at least 38 light emitters will need to be electrically coupled to the input power in series to result in a current of less than 1 amp flowing through the resultant string of light emitters.

Unlike an incandescent lamp, an LED lamp will not respond to the lower average power produced on the AC line by a standard light dimmer (not shown). The distorted waveform resulting from a dimmer setting less than 100% will not accurately reflect the dimming level the user desires because of the photo-retentive effect of the human retina. To compensate for this phenomenon, a second analog input (not shown) to the control circuit 12 may be used to measure the waveform of the applied AC power. In the case of an external light dimmer circuit the waveform is highly distorted from the normal sinusoid. This distortion from sinusoid is measured and the percent of dimming desired is thus accurately determined. In this case, the current flowing through the LEDs can be set lower than the nominal, resulting in a dimming function that correctly corresponds to the position setting of the dimmer.

Figure 2:
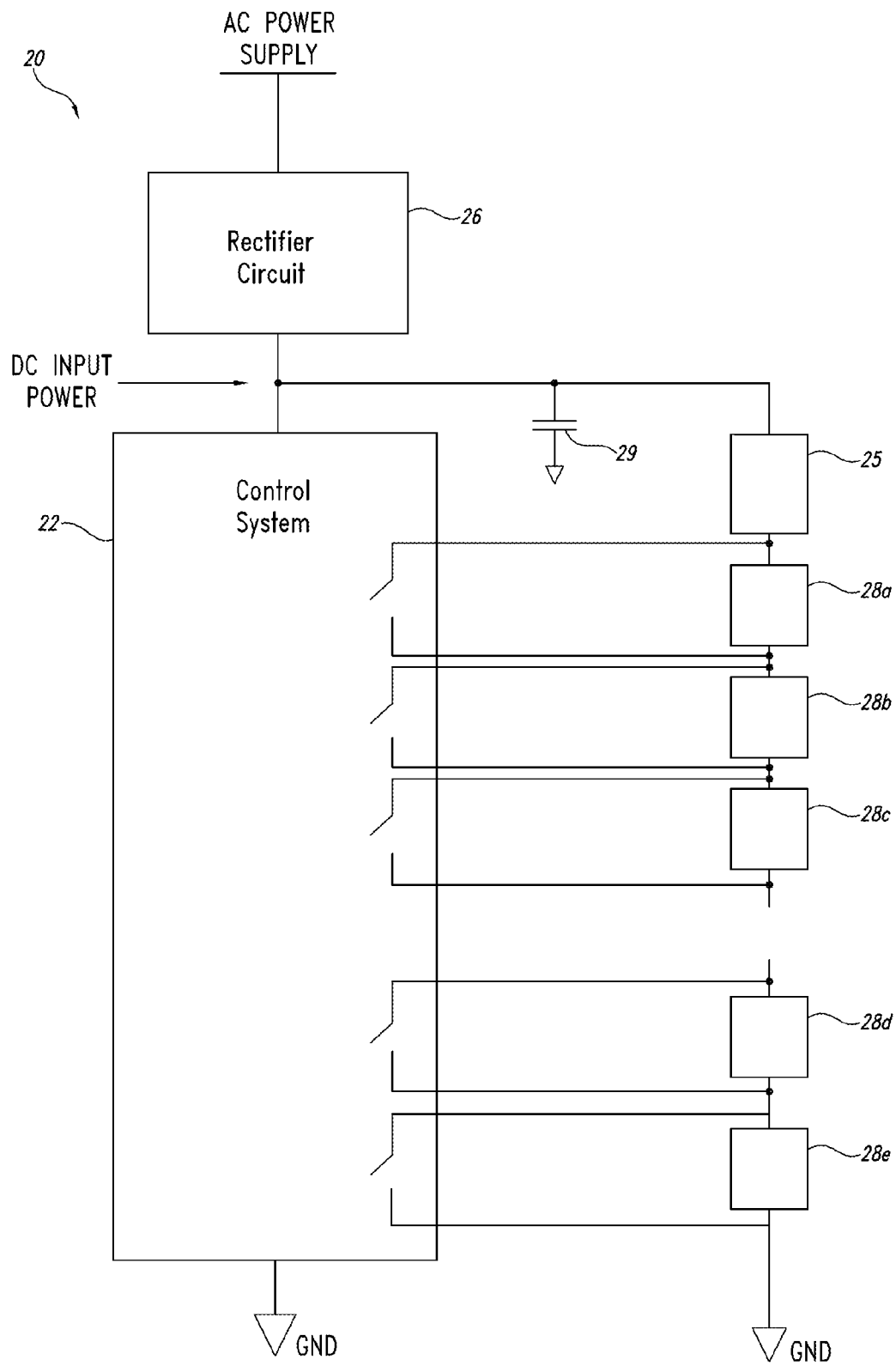
FIG. 2 is a diagram showing an illumination device according to one non-limiting illustrated embodiment.

As illustrated in FIG. 2, an illumination device 20 may include a finite number of light emitters, grouped into a base string 25 and substrings 28a-28e, and a control system 22 electrically coupled to the light emitters. Each of the base string 25 and substrings 28a-28e may include one or more light emitters electrically coupled in series. In one embodiment, the light emitters in the base string 25 and the substrings 28a-28e may be solid-state light emitters. In another embodiment, the light emitters in the base string 25 and the substrings 28a-28e may be LEDs. In one embodiment, the control system 22 may comprise a processor. In one embodiment, the control system 22 and at least one of the light emitters (including the base string 25 and the substrings 28a-28e) may be integral parts of an LED-array light source. In another embodiment, the control system 22 and at least one of the light emitters may be integral parts of a monolithic LED light source.

In one embodiment, the control system 22 may include a regulator such as the regulator device 10 shown in FIG. 1A. The control system 22 may include a microcontroller, an ADC, or a plurality of comparator circuits as described above in reference to FIGS. 1A-1C. The control system 22 may also include the PWM modules 16a-16e, the triangle wave generator 82, the voltage regulator 96 and other components as described above in reference to FIGS. 1D-1F. The control system 22 is coupled to receive a DC input power and sense at least one operational parameter of the input power, which may be the current value or the voltage value, or both, of the input power.

In one embodiment, the base string 25 is electrically coupled to receive the input power regardless what value the sensed operational parameter of the input power may be at. This way, there will be at least those light emitters in the base string 25 electrically coupled to the input power to emit light, provided that the voltage value of the input power is no less than the forward voltage drop value of the string 25.

Based on the sensed operational parameter of the input power, the control system 22 electrically couples none or more of the substrings 28a-28e in series with the base string 25 to receive the input power to emit light. When the sensed operational parameter is below a first threshold value, only the base string 25 is electrically coupled to receive the input power to emit light. When the sensed operational parameter exceeds the first threshold value by less than a first amount, the control system 22 electrically couples one of the substrings 28a-28e in series with the string 25 to increase the number of light emitters in the resultant string. When the sensed operational parameter exceeds the first threshold value by more than the first amount but less than a second amount, the control system 22 electrically couples an additional one of the substrings 28a-28e in series with the resultant string. The process continues until the sensed operational parameter is above a second threshold value that is greater than the first threshold value with all the substrings 28a-28e electrically coupled in series with the base string 25 to have a maximum number of light emitters in the resultant string. When the sensed operational parameter decreases in value, the control system 22 decouples one or more of the substrings 28a-28e from the resultant string accordingly.

The objective of the aforementioned operation is to electrically couple a number of light emitters (hence a corresponding mixture of the substrings 28a-28e with the base string 25) to provide a resultant string of light emitters electrically coupled in series that has a forward voltage drop value at approximately a desired level to regulate the current flowing through the light emitters. The operation of electrically coupling/decoupling the substrings 28a-28e to be in series with the base string 25 may be similar to the operation of the regulator device 10 of FIGS. 1A-1C as described above and, in the interest of brevity, will not be described again.

In one embodiment, the illumination device 20 may include a rectifier circuit 26, such as a bridge rectifier. The rectifier circuit 26 is used to convert AC power mains current into 120 Hz DC pulses to drive the resultant string of light emitters. This allows the light emitters to emit light at a high enough frequency that avoids visible flickering of the light. The rectifier circuit 26 may be coupled to receive electrical power from an AC power source and provide the input power in DC form to the control system 22 and the base string 25.

Figure 6:
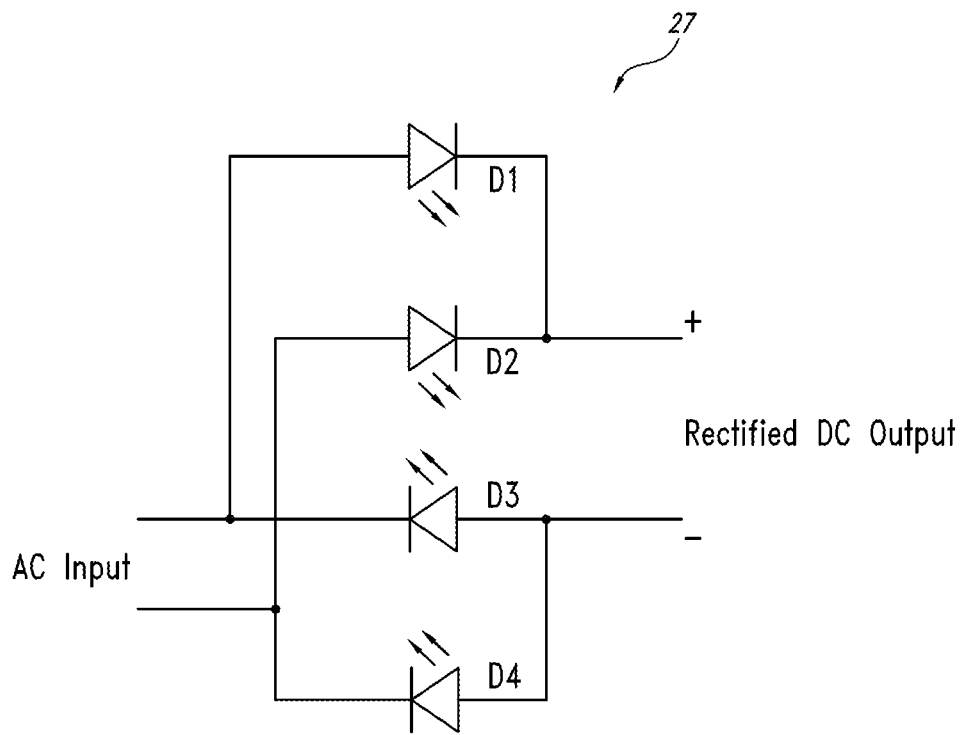
FIG. 6 is a diagram showing a rectifier circuit according to one non-limiting illustrated embodiment.

FIG. 6 shows an LED-based bridge rectifier 27, according to one illustrated embodiment. The LED-based bridge rectifier 27 may be used as the rectifier circuit 26 in place of a standard bridge rectifier. The LED-based bridge rectifier 27 has LEDs D1, D2, D3, and D4 arranged to form a rectifier bridge as shown in FIG. 6. Depending on the polarity of the AC input power, either the LEDs D1 and D4 are forward biased or the LEDs D2 and D3 are forward biased to provide the rectified DC output. The LEDs D1, D2, D3, and D4 provide the rectification as well as improve the efficiency of the final LED lamp by emitting light. This dual function replaces the standard bridge rectifier, which consumes power but does not emit light as the does LED-based bridge rectifier 27. The power consumed by a standard bridge rectifier is approximately 2V (i.e., the forward drop across diodes) times the lamp current caused by the two diodes in the standard bridge rectifier that conduct during rectification. In alternative embodiments, one or more but not all of the diodes in the LED-based bridge rectifier 27 may be LEDs.

The nominal line voltage of 120 VRMS becomes a pulse DC voltage of approximately 170V peak-to-peak, which requires a resultant string of approximately 53 LEDs at rated current, with each LED having a typical forward voltage drop of 3.2 volts. A low line voltage of 90 VRMS will result in approximately 127V peak-to-peak, which requires a resultant string of approximately 40 LEDs at rated current. A high line voltage of 130 VRMS results in a pulsed DC voltage of 184V peak-to-peak and a resultant string of approximately 58 LEDs.

In one embodiment, the illumination device 20 may include an energy storage element 29, such as a capacitor, coupled to the output of the rectifier circuit 26 (or the input of the control system 22 and the base string 25). The energy storage element 29 provides a substantially constant DC voltage for the light emitters in the base string 25 as well as the substrings 28a-28e when they are electrically coupled in series to receive the input power. The control system 22 will operate in the same manner as with a pulsing DC voltage, but does not switch as many light emitters. This is because the current flowing through the light emitters will be substantially constant when the string length (i.e., the number of light emitters electrically coupled in series) is set appropriately and as long as the average value of the input voltage remains relatively constant. The energy storage element 29 also helps to result in better utilization of the light emitters because of the continuous time of light emission by the resultant string of light emitters coupled to the input power.

Figure 3:
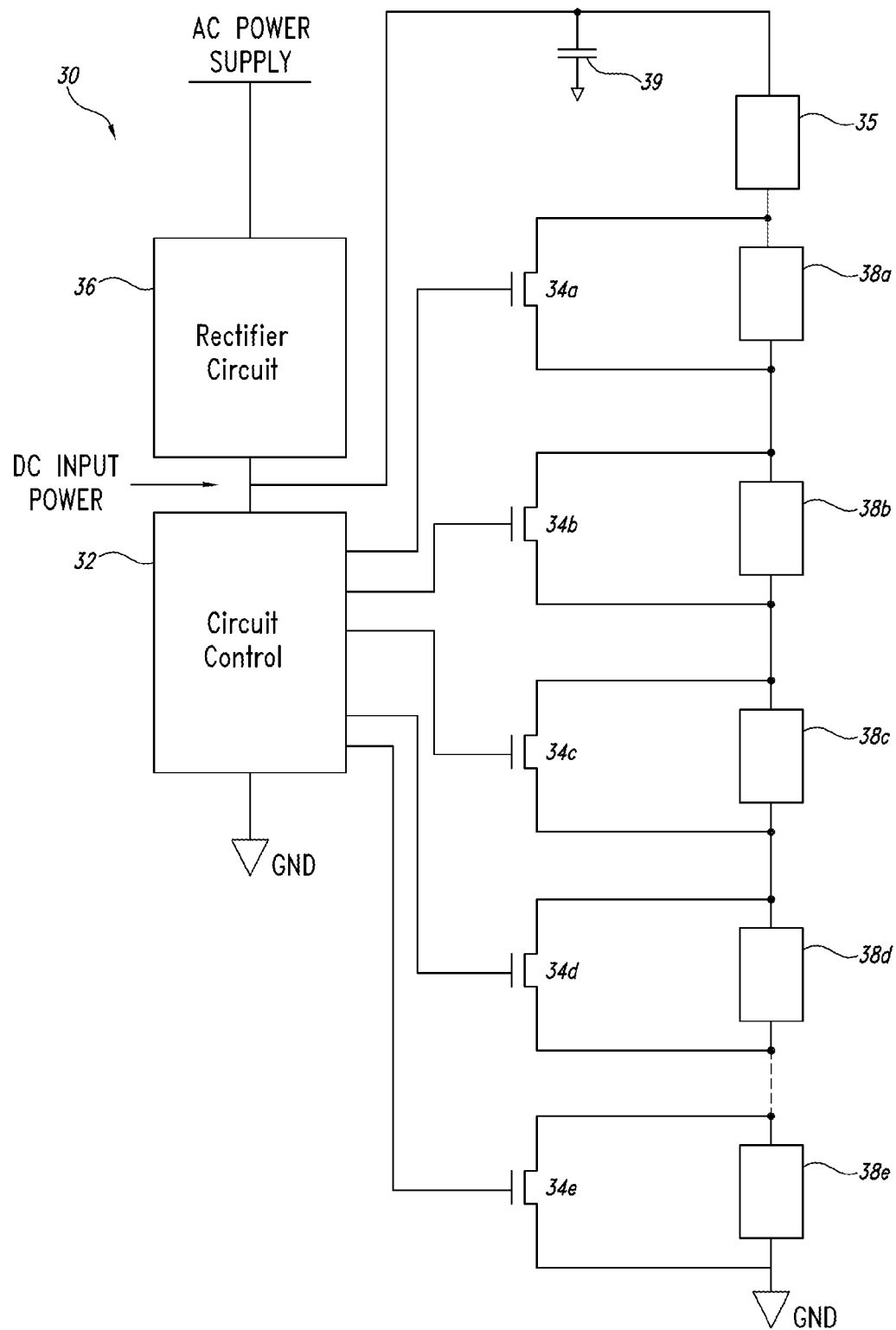
FIG. 3 is a diagram showing an illumination device according to another non-limiting illustrated embodiment.

As illustrated in FIG. 3, an illumination device 30 may include a finite number of light emitters, grouped into a base string 35 and substrings 38a-38e, a plurality of switches 34a-34e, and a control circuit 32 electrically coupled to the switches 34a-34e. Each of the base string 35 and substrings 38a-38e may include one or more light emitters electrically coupled in series. In one embodiment, the light emitters in the base string 35 and the substrings 38a-38e may be solid-state light emitters. In another embodiment, the light emitters in the base string 35 and the substrings 38a-38e may be LEDs. In one embodiment, the control circuit 32 may comprise a processor. In one embodiment, the control circuit 32 and at least one of the switches 34a-34e and the light emitters (including the base string 35 and the substrings 38a-38e) may be integral parts of an LED-array light source. In another embodiment, the control circuit 32 and at least one of the switches 34a-34e and the light emitters may be integral parts of a monolithic LED light source.

In one embodiment, the control circuit 32 may be similar to the control circuit 12 of FIG. 1A. The control circuit 32 may include a microcontroller, an ADC, or a plurality of comparator circuits as described above in reference to FIGS. 1A-1C. The control circuit 32 may also include the PWM modules 16a-16e, the triangle wave generator 82, the voltage regulator 96 and other components as described above in reference to FIGS. 1D-1F. The control circuit 32 is coupled to receive a DC input power and sense at least one operational parameter of the input power, which may be the current value or the voltage value, or both, of the input power.

Each of the plurality of switches 34a-34e may be electrically coupled across a respective string 38a-38e. For example, switch 34a may be electrically coupled across the substring 38a, switch 34b may be electrically coupled across the substring 38b, switch 34c may be electrically coupled across the substring 38c, switch 34d may be electrically coupled across the substring 38d, and switch 34e may be electrically coupled across the substring 38e. In one embodiment, each of the switches 34a-34e may be a solid-state switch. In one embodiment, each of the switches 34a-34e may be a transistor, such as, for example, an IGBT, a MOSFET or a BJT.

In one embodiment, the number of light emitters in the resultant string of light emitters that is electrically coupled in series to the input power may be varied in a sequential fashion. More specifically, by selectively electrically coupling one or more of the substrings 38a-38e in series with the base string 35, where each of the substrings 38a-38e includes one light emitter. For example, the control circuit 32 may electrically couple, one at a time, the substrings 38a-38e in series with the base string 35 to form a resultant string or decouple, one at a time, the substrings 38a-38e from the resultant string to sequentially increment or decrement the number of light emitters in the resultant string of light emitters.

Alternatively, a binary control method may be used where fewer switches are needed to switch in or out substrings of light emitters to adjust the number of light emitters in the resultant string in a more economical way. In one embodiment, the substrings 38a-38e may include one, two, four, eight, and sixteen light emitters, respectively. Accordingly, light emitters may be added to or removed from the resultant string in a quantity that is binary-based number. In other words, the number of light emitters in the resultant string may be increased or decreased by a quantity of one, two, four, eight, sixteen, or any combination thereof.

In an embodiment, the base string 35 has twenty-two LEDs with the substrings 38a-38e having one, two, four, eight, and sixteen LEDs, respectively. This will result in a maximum number of LEDs in the resultant string to be fifty-three. The substrings 38a-38e may be switched in (i.e., electrically coupled in series) to form a resultant string having a number of light emitters the quantity of which can vary from twenty-two LEDs to fifty-three LEDs with a resolution of one LED forward voltage $V_f$. A resolution finer than one LED $V_f$ is not required to achieve high performance because the LED forward voltage $V_f$ is typically somewhat compliant and changes with the current flowing through the LED. In this embodiment, one $V_f$ represents a resolution of approximately 4.5% of the shortest resultant string.

In one embodiment, the illumination device 30 may include a rectifier circuit 36, such as a bridge rectifier. The rectifier circuit 36 may be coupled to receive electrical power from an AC power source and provide the input power in DC form to the control circuit 32 and the base string 35. The rectifier circuit 36 may be similar to the rectifier circuit 26.

In one embodiment, the rectifier circuit 36 may include an LED-based bridge rectifier 27 of FIG. 6 in place of a standard bridge rectifier. The LED-based bridge rectifier 27 has LEDs D1, D2, D3, and D4 arranged as shown in FIG. 6. Depending on the polarity of the AC input power, either the LEDs D1 and D4 are forward biased or the LEDs D2 and D3 are forward biased to provide the rectified DC output. The LEDs D1, D2, D3, and D4 provide the rectification as well as improve the efficiency of the final LED lamp by emitting light. This dual function replaces the standard bridge rectifier, which consumes power but does not emit light as does the LED-based bridge rectifier 27. The power consumed by a standard bridge rectifier is approximately 2V (i.e., forward drop across diodes) times the lamp current caused by the two diodes in the standard bridge rectifier that conduct during rectification. In alternative embodiments, one or more but not all of the diodes in the LED-based bridge rectifier 27 may be LEDs.

In one embodiment, the illumination device 30 may include an energy storage element 39, such as a capacitor, coupled to the output of the rectifier circuit 36 (or the input of the control circuit 32 and the base string 35). The energy storage element 39 may be similar to the energy storage element 29. In the interest of brevity, the detailed structure and operation of the energy storage element 39 will neither be described nor illustrated since energy storage elements are well known in the art.

Figure 4:
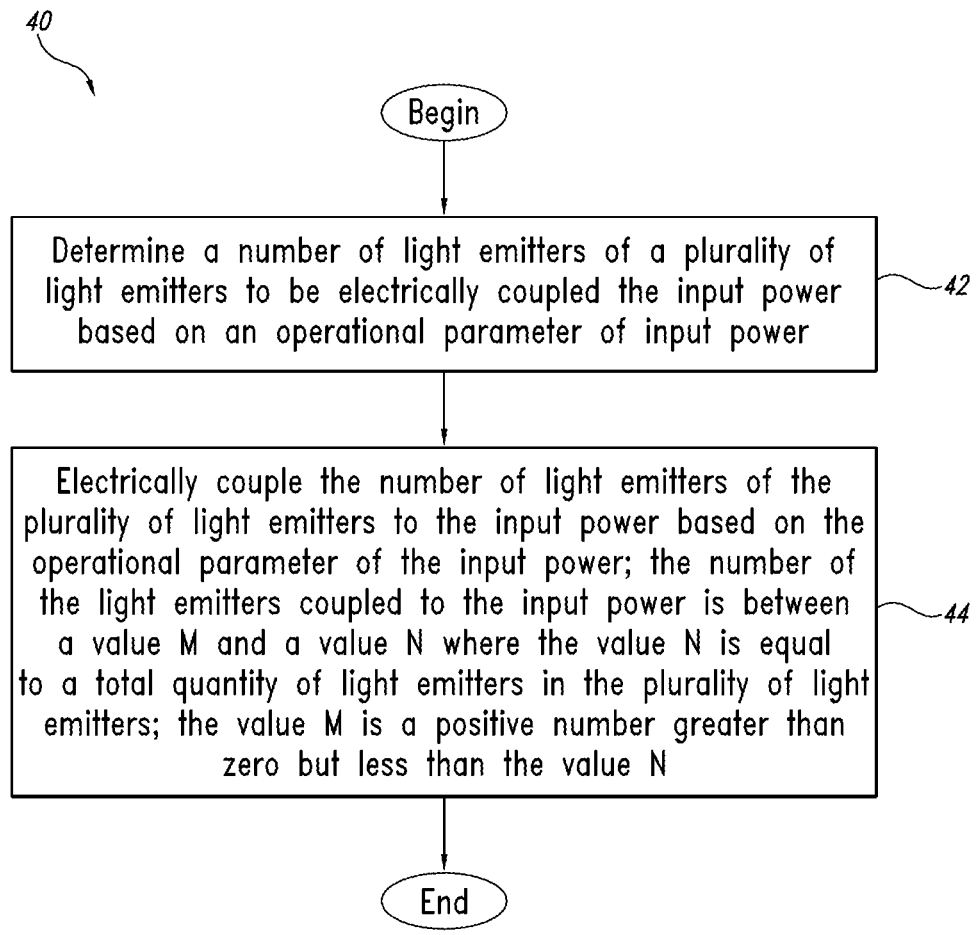
FIG. 4 is a flow diagram showing a method to regulate an input power according to one non-limiting illustrated embodiment.

FIG. 4 illustrates a process 40 to regulate an input power according to one non-limiting illustrated embodiment. At 42, an operational parameter of an input power is sensed. Next, at 44, a number of light emitters of a plurality of light emitters are electrically coupled to the input power corresponding to the sensed operational parameter of the input power. The number of the light emitters electrically coupled to the input power is between M and N where the plurality of light emitters has a total quantity of N light emitters. M is a positive number greater than zero but less than N.

In one embodiment, M light emitters are electrically coupled in series with the input power when the sensed operational parameter of the input power is equal to or less than a threshold value. When the sensed operational parameter of the input power is equal to or greater than a threshold value, R light emitters are electrically coupled in series with the input power, where R is a positive number between M and N. The number of light emitters electrically coupled in series with the input power may be varied between M and N by a variable increment depending on the sensed operational parameter of the input power, and the variation may range between 1 and N−M. In one embodiment, the variation may be between M and N by a number of 2 to the $P^{th}$ power, where P is a positive integer greater than or equal to zero. In another embodiment, the variation may be between M and N by an increment or decrement of 1 when the sensed operational parameter of the input power is greater than a threshold value.

In one embodiment, a number of switches electrically coupled between the light emitters and the input power are deactivated to electrically couple a respective number of the light emitters to the input power when the sensed operational parameter of the input power exceeds a second threshold value that is greater than the first threshold value.

The light emitters may be solid-state light emitters or, more specifically, LEDs.

Figure 5:
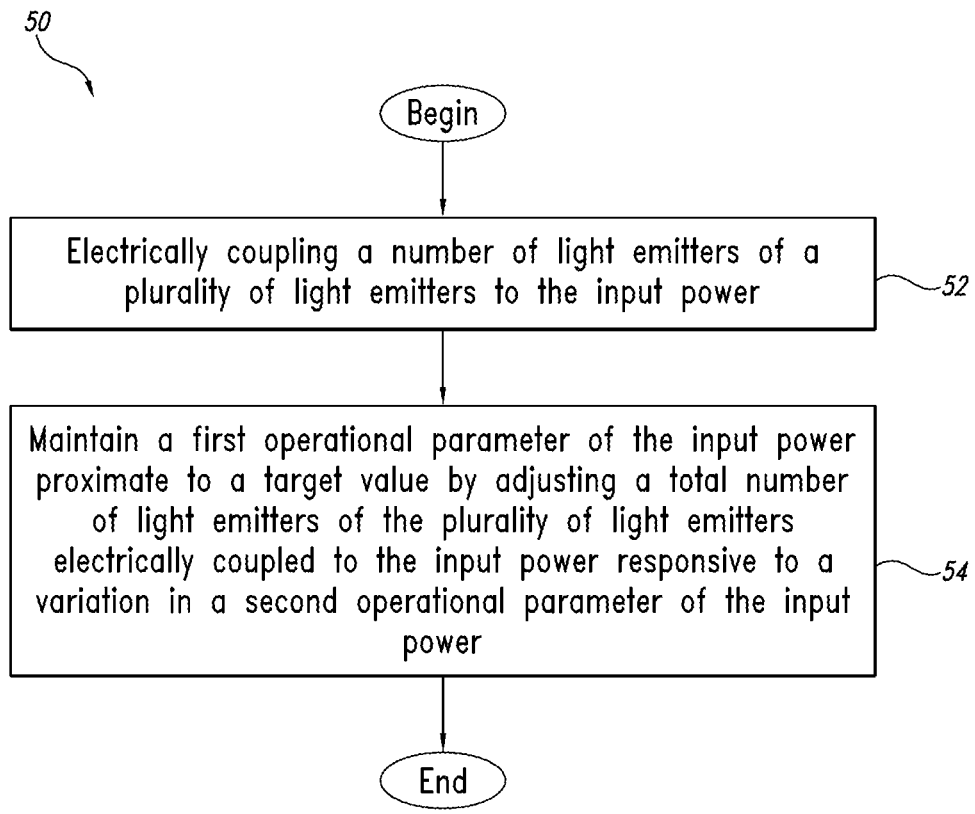
FIG. 5 is a flow diagram showing a method to regulate an input power according to another non-limiting illustrated embodiment.

FIG. 5 illustrates a process 50 to regulate an input power according to another non-limiting illustrated embodiment. At 52, a number of light emitters of a plurality of light emitters are electrically coupled to an input power. At 54, a first operational parameter of the input power is maintained proximate to a target value by adjusting the number of light emitters of the plurality of light emitters electrically coupled to the input power corresponding to a variation in a second operational parameter of the input power.

In one embodiment, the first and second operational parameters of the input power may be different, such as one being the current value and the other being the voltage value of the input power. Alternatively, the first and second operational parameters of the input power may be the same, whether the current value or the voltage value of the input power. In one embodiment, the current value of the input power is maintained proximate to a target current value.

As with the light emitters if the process 40, the light emitters in process 50 may be solid-state light emitters or, more specifically, LEDs.

The first operational parameter of the input power may be maintained by a variety of ways. In one embodiment, a first number of light emitters of the plurality of light emitters are electrically coupled in series to the input power when the second operational parameter of the input power is equal to or less than a first threshold value. When the second operational parameter is between the first threshold value and a second threshold value that is greater than the first threshold value, a variable number of light emitters of the plurality of light emitters may be electrically coupled in series to the input power where the variable number is greater than the first number. Further, when the second operational parameter exceeds the second threshold value, all of the light emitters of the plurality of light emitters are electrically coupled in series to the input power. The number of light emitters electrically coupled to the input power may be adjusted proportionally to the variation in the second operational parameter. In one embodiment, this may be achieved by electrically coupling substrings of light emitters of the plurality of light emitters in series to the input power according to a variation in the second operational parameter. In one embodiment, a voltage drop across the number of light emitters electrically coupled in series to the input power is maintained according to a variation in the second operational parameter.

Thus, a regulator device, such as the regulator device 10, an illumination device, such as the illumination device 20 and 30, and methods, such as the processes 40 and 50, are disclosed herein and should provide a simple and cost-efficient electronic ballast to dynamically regulate the current flowing through the string of LEDs emitting light. For instance, at least some embodiments allow the input power current to flow through some of the LEDs but electrically short or bypass the other LEDs to vary the number of LEDs in the string of LEDs electrically coupled in series to the input power to vary the string forward voltage in relation to the applied voltage. The current flowing through the string of LEDs or the voltage applied to the string, or both, is sensed and LEDs are switched in or out to adjust the number of LEDs in the string to provide the proper current at the applied voltage. This has the advantage that the LED light may be used over the standard AC voltage range of 90 VRMS to 130 VRMS with no loss of efficiency and no danger of excessive current being applied to the string. In addition, the regulator device as well as the illumination device begins and ends the cycle with a short string of LEDs so that light begins to be emitted at a much lower voltage, thereby using the LEDs over a much larger phase angel of the AC cycle.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of solid-state luminaire generally described above.

It will be understood by those skilled in the art that, although the embodiments described above and shown in the figures are generally directed to the context of solid-state lighting, luminaire utilizing traditional or other non-solid state lighting source may also benefit from the concepts described herein. For example, although the embodiments described above and shown in the figures are directed to luminaires using solid-state lighting source, the concepts and the embodiments described herein are equally applicable to luminaires other than those using solid-state lighting source. Further, although strings of light emitters are shown in the figures, the various embodiments may be utilized with other types of loads, whether light-emitting or not.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

U.S. Provisional Patent Application No. 61/115,438, filed Nov. 17, 2008, U.S. Provisional Patent Application No. 61/154,619, and U.S. patent application Ser. No. 12/619,535, filed Nov. 16, 2009 are incorporated herein by reference, in their entirety.

I claim:

1. A regulator device to regulate an input power supply that supplies power to a plurality of light emitters, the plurality of light emitters electrically coupled in series between an input power node of the input power supply and a reference node, the regulator device comprising:
   a plurality of switches each of which selectively electrically couples a respective number of the light emitters to receive power from the input power supply via the input power node when the switch is deactivated; and
   a control circuit electrically coupled to the input power node of the input power supply and controllingly coupled to the plurality of switches, the control circuit senses an operational parameter of the input power supply, the operational parameter comprising an entire voltage value between the input power node of the input power supply and the reference node, the control circuit deactivates a number of the switches to electrically couple the respective light emitters to the input power supply and a first number of the light emitters responsive to the sensed operational parameter of the input power supply, and adjusts the number of the switches deactivated responsive to a change in the sensed operational parameter of the input power supply, where the first number of the light emitters are coupled to the input power supply regardless of the sensed operational parameter of the input power supply.

2. The regulator device of claim 1 wherein the control circuit deactivates a number of the switches to electrically couple the respective light emitters in series to the input power supply to emit light responsive to the sensed operational parameter of the input power supply, and wherein the control circuit adjusts the number of the switches deactivated to adjust the number of light emitters electrically coupled in series to the input power supply responsive to a change in the sensed operational parameter of the input power supply.

3. The regulator device of claim 2 wherein the control circuit senses a current value of the input power supply applied to the number of light emitters electrically coupled in series to the input power supply.

4. The regulator device of claim 1 wherein each of the plurality of switches is electrically coupled to a respective one of the light emitters.

5. The regulator device of claim 1 wherein a first switch of the plurality of switches selectively electrically shorts a first number of the light emitters, wherein a second switch of the plurality of switches selectively electrically shorts a second number of the light emitters, the second number being twice the first number.

6. The regulator device of claim 1 wherein the control circuit adjusts the number of switches deactivated to adjust the number of the respective light emitters electrically coupled in series to the input power supply to achieve a target voltage drop across the total number of light emitters electrically coupled in series to the input power supply responsive to a change in the sensed operational parameter of the input power supply.

7. The regulator device of claim 1 wherein the control circuit adjusts the number of switches deactivated to adjust the number of the respective light emitters electrically coupled in series to the input power supply to achieve a target current value of a current flowing through the total number of light emitters electrically coupled in series to the input power supply responsive to a change in the sensed operational parameter of the input power supply.

8. The regulator device of claim 1 wherein the control circuit includes a microcontroller, the microcontroller activates and deactivates a number of the switches to adjust a total number of the plurality of light emitters electrically coupled in series to the input power supply responsive to the sensed operational parameter of the input power supply.

9. The regulator device of claim 1 wherein the control circuit includes a current sensor which senses a current value of the input power supply, and wherein the current sensor comprises one of a resistive sensor, a Hall-effect sensor, and a sense-coil type sensor.

10. The regulator device of claim 1 wherein the control circuit includes a plurality of pulse width modulation (PWM) modules each of which electrically coupled to drive a respective one of the plurality of switches.

11. The regulator device of claim 10 wherein at least one of the PWM modules drives the respective switch with a pulse stream of increasing duty cycle to activate the respective switch.

12. The regulator device of claim 10 wherein at least one of the PWM modules drives the respective switch with a pulse stream of decreasing duty cycle to deactivate the respective switch.

13. The regulator device of claim 10 wherein the control circuit further includes a triangle wave generator which provides a triangular-wave signal to the PWM modules.

14. The regulator device of claim 1, further comprising:
a voltage regulator which provides a regulated input power to power the control circuit, the voltage regulator electrically coupled to receive power from a base string of light emitters of the plurality of light emitters that is coupled to receive the input power supply.

15. The regulator device of claim 1 wherein the control circuit and the switches are parts of a processor.

16. A method to regulate an input power supply, the input power supply comprising an input power node electrically coupled to a plurality of light emitters, the plurality of light emitters electrically coupled in series between the input power node of the input power supply and a reference node, the method comprising:
sensing an operational parameter of the input power supply, the operational parameter comprising an entire voltage value between the input power node of the input power supply and the reference node;
responsive to sensing the operational parameter, determining a number of light emitters of the plurality of light emitters to be electrically coupled the input power supply via the input power node; and
electrically coupling the number of light emitters of the plurality of light emitters to the input power supply based on the operational parameter of the input power supply, the number of the light emitters coupled to the input power supply being between a value M and a value N where the value N is equal to a total quantity of light emitters in the plurality of light emitters, the value M being a positive number greater than zero but less than the value N.

17. The method of claim 16 wherein sensing the operational parameter of the input power supply comprises sensing a current value and a voltage value of the input power, supply.

18. The method of claim 16 wherein electrically coupling a number of light emitters of the plurality of light emitters to the input power supply based on the operational parameter of the input power supply comprises electrically coupling a number M of the light emitters in series to the input power supply in response to the operational parameter of the input power supply being equal to or less than a threshold value.

19. The method of claim 16 wherein electrically coupling a number of light emitters of the plurality of light emitters to the input power supply based on the operational parameter of the input power supply comprises electrically coupling a number R of the light emitters in series to the input power supply responsive to the sensed operational parameter of the input power supply being equal to or greater than a threshold value, where the number R is a positive number between M and N.

20. The method of claim 16 wherein electrically coupling a number of light emitters of the plurality of light emitters to the input power supply based on the operational parameter of the input power supply comprises varying the number of the light emitters electrically coupled in series to the input power supply to be between the value M and the value N by a variable increment responsive to the sensed operational parameter of the input power supply, the variable increment ranging between 1 and a value equal to N minus M.

21. The method of claim 20 wherein varying the number of the light emitters electrically coupled in series to the input power supply to be between the value M and the value N by a variable increment comprises varying the number of the light emitters electrically coupled in series to the input power supply to be between the value M and the value N by a number of 2 to the $P^{th}$ power, where P is a positive integer greater than or equal to zero.

22. The method of claim 16 wherein electrically coupling a number of light emitters of the plurality of light emitters to the input power supply based on the operational parameter of the input power supply comprises varying the number of the light emitters electrically coupled in series to the input power supply to be between the value M and the value N by an increment or decrement equal to 1 responsive to the sensed operational parameter of the input power supply being greater than a threshold value.

23. The method of claim 16 wherein electrically coupling a number of light emitters of the plurality of light emitters to the input power supply based on the operational parameter of the input power supply comprises deactivating a number of a plurality of switches to electrically couple a respective number of the light emitters to the input power supply in response to the operational parameter of the input power supply being greater than a threshold value, the respective number of the emitters coupled to the input power supply being between the value M and the value N.

24. The method of claim 16 wherein electrically coupling a number of light emitters of the plurality of light emitters to the input power supply comprises electrically coupling a number of solid-state light emitters of a plurality of solid-state light emitters to the input power supply.

25. The method of claim 16 wherein electrically coupling a number of light emitters of the plurality light emitters to the input power supply comprises electrically coupling a number of light-emitting diodes (LEDs) of a plurality of LEDs to the input power supply.

\* \* \* \* \*